United States Patent
Chang

(10) Patent No.: US 11,609,340 B2
(45) Date of Patent: *Mar. 21, 2023

(54) SYSTEM AND METHOD FOR GPS BASED AUTOMATIC INITIATION OF SENSOR CALIBRATION

(71) Applicant: PlusAI, Inc., Cupertino, CA (US)

(72) Inventor: Huan Yang Chang, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,773

(22) Filed: Jun. 21, 2022

(65) Prior Publication Data

US 2022/0317313 A1 Oct. 6, 2022

Related U.S. Application Data

(63) Continuation of application No. 16/848,073, filed on Apr. 14, 2020, now Pat. No. 11,366,233.

(51) Int. Cl.
*G01S 19/26* (2010.01)
*G01S 19/23* (2010.01)
*G01S 19/14* (2010.01)

(52) U.S. Cl.
CPC .......... *G01S 19/235* (2013.01); *G01S 19/14* (2013.01)

(58) Field of Classification Search
CPC ......... G01S 19/235; G01S 19/26; G01S 19/14
USPC ................................................ 342/357.62
See application file for complete search history.

(56) References Cited

U.S. PATENT DOCUMENTS

| 9,311,706 B2 | 4/2016 | Natroshvili et al. |
|---|---|---|
| 10,109,066 B2 | 10/2018 | Lee et al. |
| 10,235,817 B2 | 3/2019 | Saeger et al. |
| 10,489,912 B1 | 11/2019 | Brailovskiy |
| 10,723,281 B1 | 7/2020 | Briggs |
| 10,785,474 B1 | 9/2020 | Semansky |
| 11,042,762 B2 | 6/2021 | Li et al. |
| 11,315,258 B1 * | 4/2022 | Anagnostopoulos .......... H04N 5/2256 |
| 11,366,233 B2 | 6/2022 | Chang |
| 2006/0268285 A1 | 11/2006 | Karabassi et al. |

(Continued)

FOREIGN PATENT DOCUMENTS

| CN | 103337066 A | 10/2013 |
|---|---|---|
| CN | 105445721 A | 3/2016 |

(Continued)

OTHER PUBLICATIONS

International Search Report and Written Opinion dated Jul. 15, 2021 for International Application No. PCT/IB2021/053054, 9 pages.

*Primary Examiner* — Harry K Liu
(74) *Attorney, Agent, or Firm* — Sheppard Mullin Richter & Hampton LLP

(57) ABSTRACT

The present teaching relates to apparatus, method, medium, and implementations for initiating sensor calibration. A first GPS signal is received by a GPS receiver residing in an ego vehicle and is used to determine a first geo-position of the ego vehicle. A GPS related signal transmitted by a fiducial marker is received and is used to obtain a second geo-position of the fiducial marker. A distance between the ego vehicle and the fiducial marker is determined based on the first and second geo-positions and is used to determine whether to initiate calibration of one or more sensors using the fiducial marker.

20 Claims, 28 Drawing Sheets

(56) References Cited

U.S. PATENT DOCUMENTS

| | | |
|---|---|---|
| 2008/0198039 A1 | 8/2008 | Philiben |
| 2012/0173185 A1 | 7/2012 | Taylor et al. |
| 2012/0320190 A1 | 12/2012 | Natroshvili et al. |
| 2013/0305805 A1 | 11/2013 | Ahn et al. |
| 2016/0012588 A1 | 1/2016 | Taguchi et al. |
| 2016/0061627 A1 | 3/2016 | Tan et al. |
| 2016/0116573 A1 | 4/2016 | Appia et al. |
| 2017/0106738 A1* | 4/2017 | Gillett .................... B62K 25/02 |
| 2017/0350956 A1 | 12/2017 | Karlov et al. |
| 2018/0136813 A1 | 5/2018 | Abernathy |
| 2018/0150939 A1 | 5/2018 | Chan et al. |
| 2019/0033466 A1 | 1/2019 | Palella et al. |
| 2019/0049566 A1 | 2/2019 | Adams et al. |
| 2019/0120934 A1 | 4/2019 | Slutsky et al. |
| 2020/0005489 A1 | 1/2020 | Kroeger |
| 2020/0025944 A1* | 1/2020 | Mellier ................... G01S 19/43 |
| 2020/0036952 A1 | 1/2020 | Iwane |
| 2020/0101619 A1 | 4/2020 | Liu |
| 2020/0175716 A1 | 6/2020 | Miyamoto |
| 2020/0226790 A1 | 7/2020 | Alvarez et al. |
| 2020/0334861 A1 | 10/2020 | Jin et al. |
| 2020/0406904 A1 | 12/2020 | Yan et al. |
| 2020/0410715 A1 | 12/2020 | Cadien et al. |
| 2021/0009147 A1 | 1/2021 | Maag et al. |
| 2021/0012120 A1 | 1/2021 | Gummadi et al. |
| 2021/0012534 A1 | 1/2021 | Islam et al. |
| 2021/0051317 A1 | 2/2021 | Yan et al. |
| 2021/0063546 A1 | 3/2021 | Slobodyanyuk et al. |
| 2021/0129856 A1 | 5/2021 | Zack |
| 2021/0134079 A1 | 5/2021 | Nee |
| 2021/0174540 A1 | 6/2021 | Iwamoto et al. |
| 2021/0190908 A1 | 6/2021 | Mikhailov |
| 2021/0190922 A1 | 6/2021 | Yu et al. |
| 2021/0199479 A1 | 7/2021 | Lau et al. |
| 2021/0215505 A1* | 7/2021 | Castorena Martinez ................... G01C 25/005 |
| 2021/0278511 A1 | 9/2021 | Krishnan et al. |
| 2021/0294328 A1 | 9/2021 | Dhayalkar |
| 2021/0303898 A1 | 9/2021 | Wang et al. |
| 2021/0316743 A1 | 10/2021 | Chang |
| 2021/0318149 A1 | 10/2021 | Chang |
| 2021/0318448 A1 | 10/2021 | Chang |

FOREIGN PATENT DOCUMENTS

| | | | |
|---|---|---|---|
| CN | 105678783 A | | 6/2016 |
| CN | 109215063 A | | 1/2019 |
| CN | 209460399 U | | 10/2019 |
| CN | 110687562 A | * | 1/2020 |
| CN | 111127565 A | | 5/2020 |

\* cited by examiner

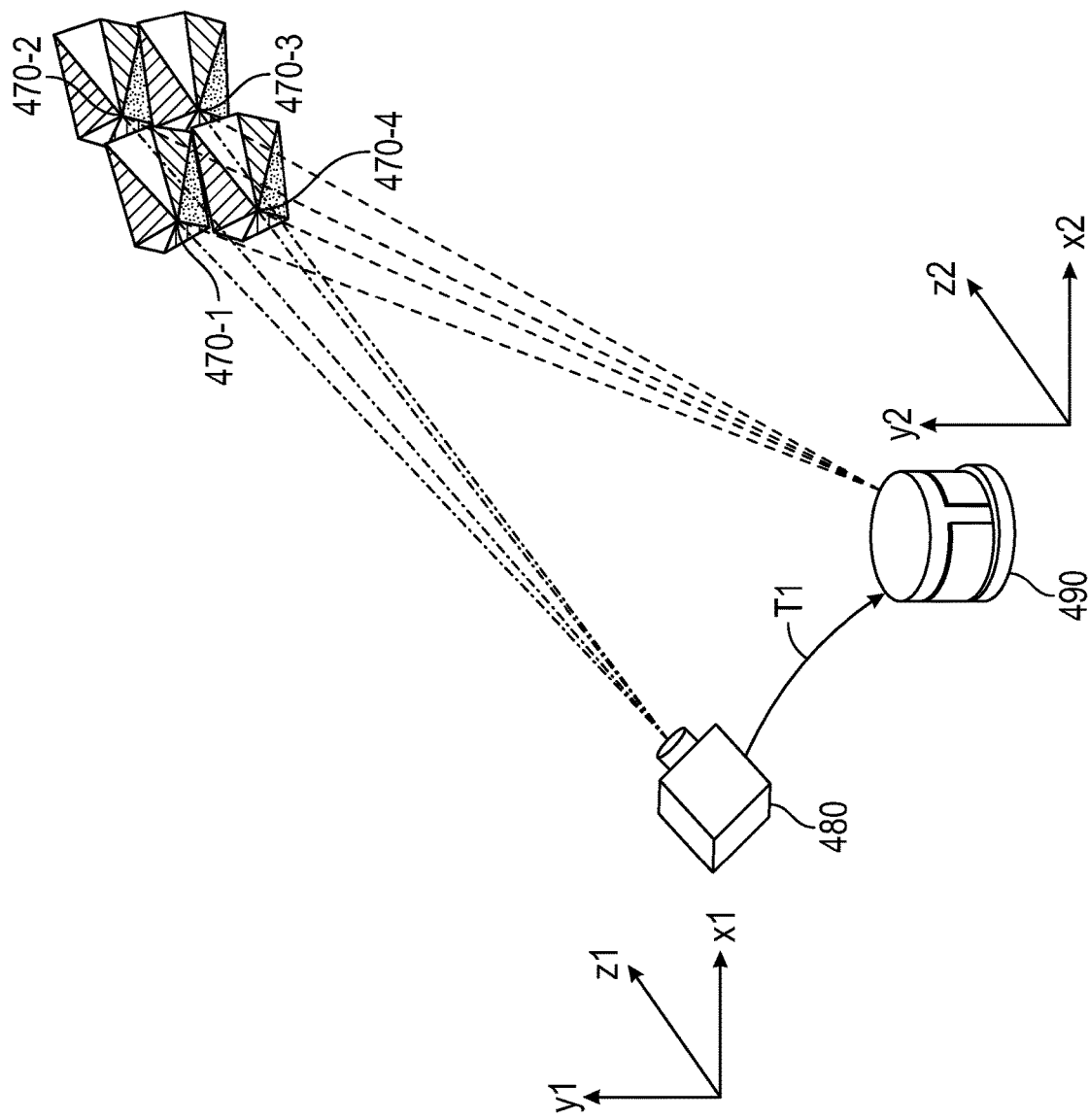

SYSTEM AND METHOD FOR GPS BASED AUTOMATIC INITIATION OF SENSOR CALIBRATION

CROSS-REFERENCE TO RELATED APPLICATIONS

This application is a continuation of U.S. patent application Ser. No. 16/848,073, filed Apr. 14, 2020, the disclosure of which is incorporated herein by reference in its entirety. The present application is related to U.S. patent application Ser. No. 16/847,847, filed Apr. 14, 2020, and U.S. patent application Ser. No. 16/847,972, filed Apr. 14, 2020, each of which are hereby incorporated by reference in their entireties.

BACKGROUND

1. Technical Field

The present teaching generally relates to calibration. More specifically, the present teaching relates to sensor calibration.

2. Technical Background

With the advancement of sensing technologies, automation in different industries relies on sensing technologies to provide accurate and reliable information about the surrounding of the automation site which forms the basis for various computerized decision makings. For example, autonomous vehicles deploy different types of sensors to gather relevant information to be used in obstacle avoidance, lane following, driving strategy determination, etc. Such sensor information allows the computer system in a moving vehicle to make correct decisions on vehicle control in dynamic situations. In such applications, sensors in multiple modalities may be deployed in order to obtain different types of information reliably in different weather and light conditions. For instance, some sensors such as a camera deployed on a vehicle is to gather visual information of the surrounding. Other sensors such as a LiDAR or a radar on the same vehicle is to gather information related to depth of all what is around the vehicle. A GPS on a vehicle is for providing geolocation information related to the vehicle.

For autonomous driving, information from different types of sensor data is often combined to make a sense of the surround as the basis of autonomous driving decisions. For instance, an object (such as a moving vehicle) in front of an autonomous vehicle may be visible in a 2D image without any depth information, while a depth sensor such as a LiDAR sensor senses only depth information without knowledge of objects. For obstacle avoidance, it is necessary to know the depth associated with each objects around the vehicle. There are different known approaches to do that. An exemplary method is stereo techniques. With advancement of sensing technologies, although a LiDAR sensor is not configured to detect objects, what is detected in a 2D image may be combined with the sensed depth map from a LiDAR to detect not only the location of different objects but also the depth information associated with each of the objects.

Traditionally, before its use, each sensor needs to be calibrated using some target and each sensor is usually calibrated separately using a target specifically designed for that type of sensor. Each calibration is performed based on its individual measurements and consequently, each calibrated sensor operates in its own coordinate system. This makes it difficult to combine results from different sensors. Conventionally, to correspond a 3D point in one coordinate system (e.g., the one used by a camera) to a corresponding point in a different coordinate system (e.g., the one used by a LiDAR), an transformation matrix may be derived based on two known sets of corresponding points from the two coordinate systems.

As calibrating different sensors requires different targets and different methods, different sensors have different measurements which are not always comparable. This makes the process of calibrating different and different types of sensors and deriving transformation matrices among different pairs of sensors labor intensive, time consuming, and error prone.

Therefore, there is a need for a more efficient approach to more effectively calibrate sensors to derive calibration parameters and efficiently derive transformation matrices for different pairs of sensors.

SUMMARY

The teachings disclosed herein relate to methods, systems, and programming for data processing. More particularly, the present teaching relates to methods, systems, and programming related to modeling a scene to generate scene modeling information and utilization thereof.

In one example, a method, implemented on a machine having at least one processor, storage, and a communication platform capable of connecting to a network for initiating sensor calibration. A first GPS signal is received by a GPS receiver residing in an ego vehicle and is used to determine a first geo-position of the ego vehicle. A GPS related signal transmitted by a fiducial marker is received and is used to obtain a second geo-position of the fiducial marker. A distance between the ego vehicle and the fiducial marker is determined based on the first and second geo-positions and is used to determine whether to initiate calibration of one or more sensors using the fiducial marker.

In a different example, the present teaching discloses a system for initiating sensor calibration. The system comprises an in-situ GPS receiver, a marker signal receiver, and an automatic calibration initiator. The in-situ GPS receiver is configured for receiving a first GPS signal and determining a first geo-position associated with the ego vehicle based on the first GPS signal. The marker signal receiver is configured for receiving a GPS related signal from a fiducial marker having a marker GPS receiver thereon to obtain a second geo-position associated with the fiducial marker based on the GPS related signal. The automatic calibration initiator is configured for estimating a distance between the ego vehicle and the fiducial marker based on the first geo-position and the second geo-position and determining, based on the distance, whether to initiate calibration of one or more sensors using the fiducial marker.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for initiating sensor calibration, wherein the medium, when read by the machine, causes the machine to perform a series of steps. initiating sensor calibration. A first GPS signal is received by a GPS receiver residing in an ego vehicle and is used to determine a first geo-position of the ego vehicle. A GPS related signal transmitted by a fiducial marker is received and is used to obtain a second geo-position of the fiducial marker. A distance between the ego vehicle and the fiducial marker is determined based on the first and second geo-positions and is used to determine whether to initiate calibration of one or more sensors using the fiducial marker.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 5A-5B show a different configuration of multiple integrated fiducial markers for simultaneously calibrating sensors and deriving a transformation matrices between different sensors, in accordance with an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the current state of the art in calibrating sensors and determining transformation matrices among different pairs of sensors. The present teaching discloses an integrated fiducial marker that provides a single source of measurement that makes measurements of different sensors comparable. Due to the comparability of measurements using the fiducial marker disclosed herein, exemplary configurations of a plurality of such integrated fiducial markers are also disclosed that enable efficient derivation of transformation matrices while calibrating multiple sensors at the same time. Such transformation matrices are used to correspond points in different coordinate systems between each pair of sensors.

The integrated fiducial marker according to the present teaching may also incorporate a GPS device with a receiver and a transmitter which sends out the geospatial pose information of the marker. Such transmitted GPS information enables a vehicle to determine a distance between the vehicle and the integrated fiducial marker. Such determined distance may then be used to by the vehicle to automatically initiate a calibration session. This makes it possible for a vehicle to conduct calibration when within a certain distance from available fiducial markers in order to dynamically update the calibration parameters of sensors deployed on the vehicle as well as the transformation matrices for different pairs of sensors.

Figure 1:
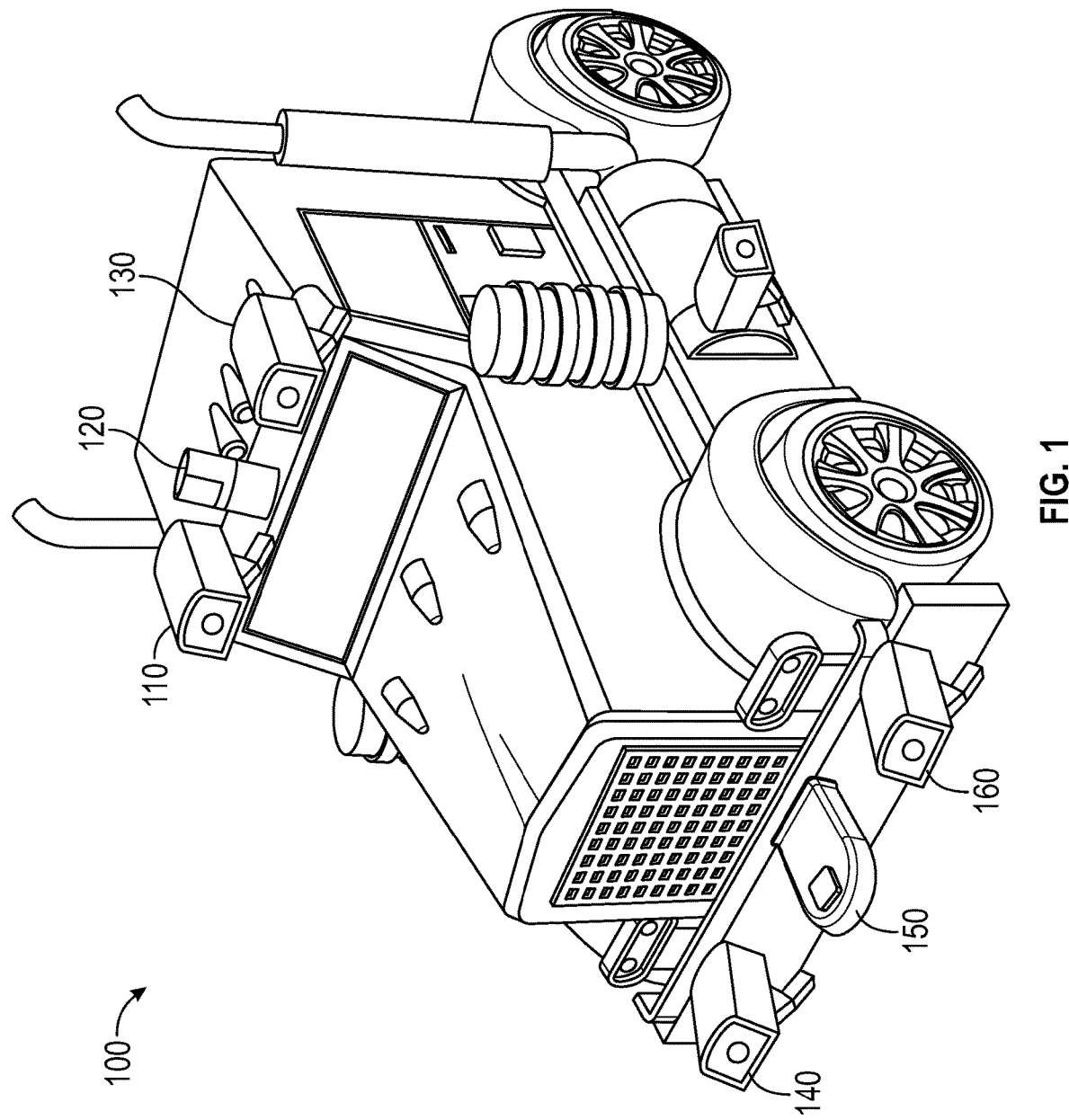
FIG. 1 illustrates an autonomous vehicle with sensors deployed thereon, in accordance with an embodiment of the present teaching.

FIG. 1 illustrates an autonomous vehicle 100 with different sensors deployed thereon, in accordance with an embodiment of the present teaching. In this illustrated embodiment, the autonomous vehicle is a truck (without trailer) that has sensors mounted on top and in front of the vehicle. The exemplary sensors as shown in FIG. 1 includes, for instance, stereo cameras 110 and 130 on top of the truck 100 for observing obstacles located in front of the vehicle, a LiDAR sensor 120 for providing depth information of the front view, a radar sensor 150 at the front of the truck, and additional cameras 140 and 150 for observing the road conditions. These exemplary sensors are installed at their designated positions and each is responsible for certain roles to gather specific type of information useful for the vehicle to make autonomous driving related decisions. For example, stereo camera pair 110 and 130 may be designated to not only see the visual scenes (objects such as trees, road signs, buildings, other obstacle vehicles, and lane marks, etc.) but also estimate the depth of the objects observed. The LiDAR sensor 120 may be designated to measure directly the depth information of the scene in front of the vehicle 100 and provide a depth map for the scene in a scan range. Radar sensor 150 may be used to sense obstacles in front of the vehicle at a lower height to detect distance of any obstacle near the road surface in front of the vehicle. Camera 140 and 160 may be used to detect objects close to the road surface such as lane marks before the vehicle.

Figure 2A:
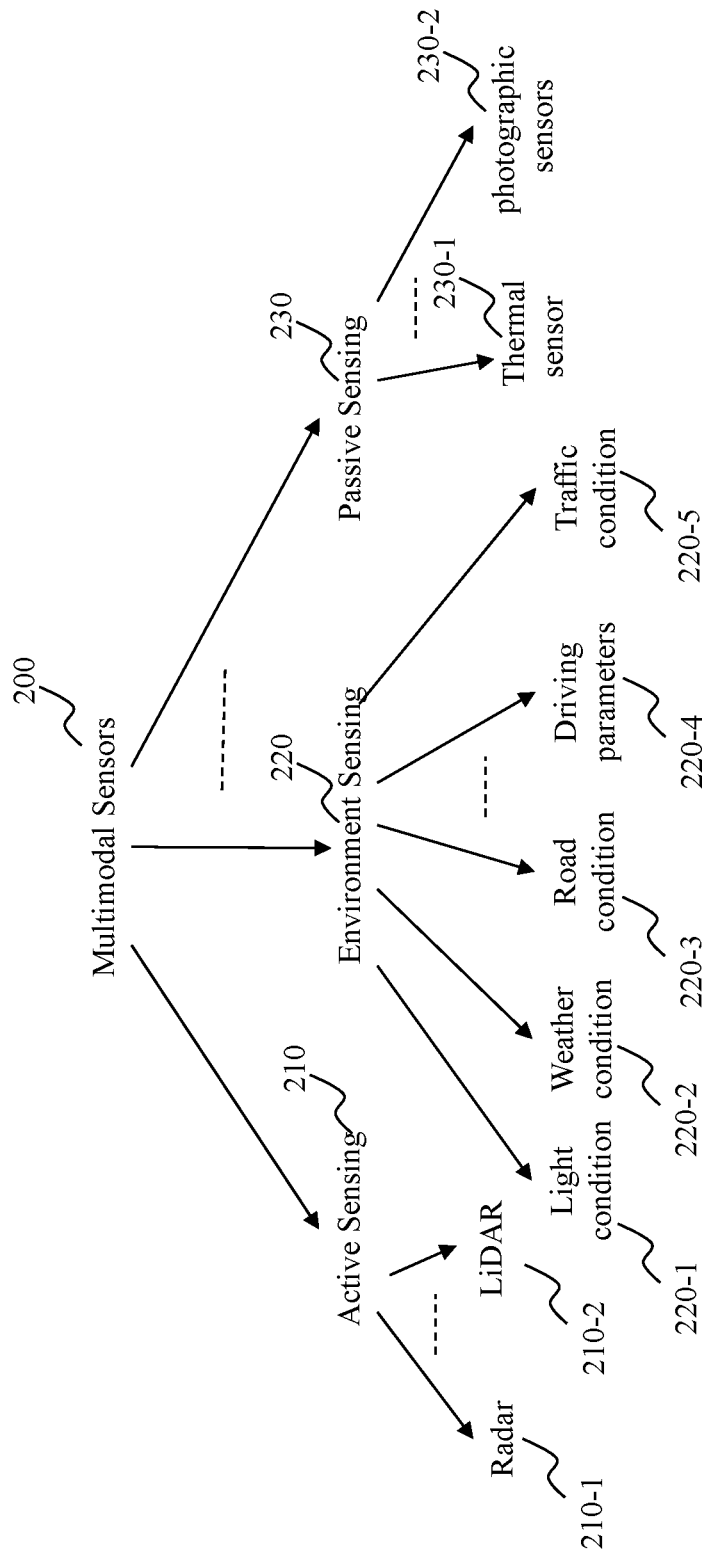
FIG. 2A shows exemplary types of sensors that may be deployed on an autonomous vehicle, in accordance with an embodiment of the present teaching.

Different types of sensors may be deployed on an autonomous vehicle. FIG. 2A shows exemplary types of sensors that may be deployed on an autonomous vehicle, in accordance with an embodiment of the present teaching. Sensors may be in multiple modalities (200). Some sensors may be directed for active sensing (210), some may be directed for environment sensing (220), and some may be passive sensing (230). Examples of active sensors may include radar sensor (210-1), . . . , LiDAR sensor (210-2), that act (emit and measure) actively to collect information needed. Examples of passive sensors include photographic sensors such as cameras (230-2) or thermal sensors (230-1) that collect data on whatever imprinted on them. Environment sensing may be conducted based on information from one or more sensors and what is sensed is about the environment such as the lighting condition (220-1), the weather condition such as rain or snow (220-2), the condition of the road such as being wet or covered by snow (220-3), driving related parameters such as slope of the road (220-4), . . . , and condition of the traffic such as how crowded the road is (220-5).

Figure 2B:
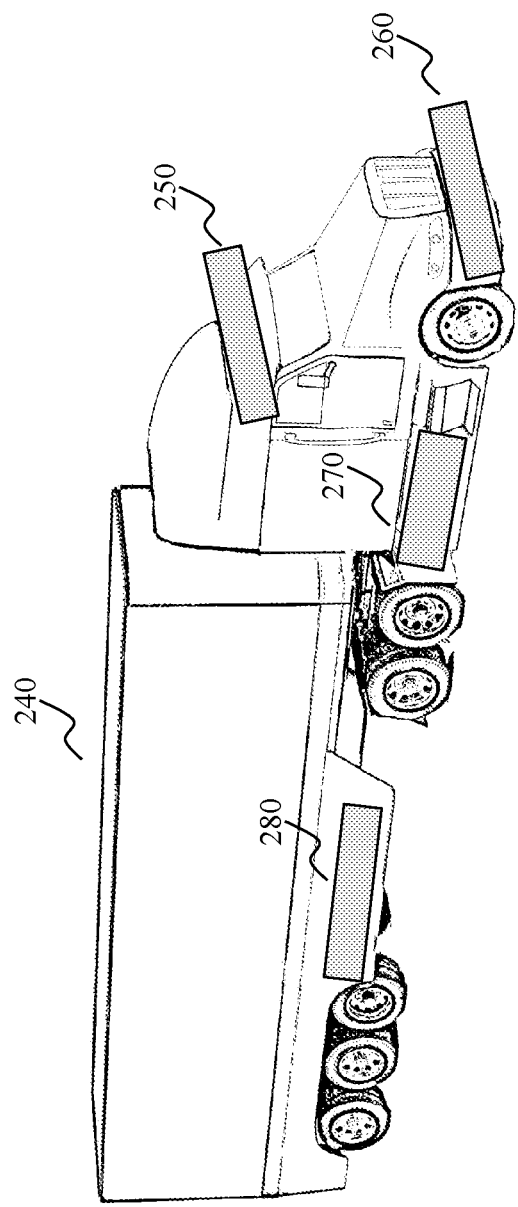
FIG. 2B depicts exemplary different sensor racks where sensors of different types are mounted at different parts of a vehicle to provide surround information to facilitate autonomous driving, in accordance with an embodiment of the present teaching.

Different types of sensors may operate in accordance with different technological principles. For example, some sensors may be directed to gather visual data based on perception such as cameras; some may be directed to distance such as LiDAR and radar; some may use light of different wavelengths for scanning such as radar and LiDAR, etc. Different sensors responsible for gathering designated information may be strategically installed at appropriate parts of the vehicle. This is shown in FIG. 2B, where different sensor racks are mounted at different parts of a vehicle to provide sensing information to facilitate autonomous driving, in accordance with an embodiment of the present teaching. Each sensor rack may have one or more sensors mounted therein. In this illustrated embodiment, there are four visible sensor racks 250, 260, 270, and 280, installed on different locations of truck 240, respectively, on the top (250), at the low front (260), at the front side (270), and at the right side of the truck (280). There may be parallel or counterpart of sensor racks 270 and 280 installed on the opposing sides of the truck (not shown). Each rack may also have different types of sensors mounted. For instance, the sensors in rack 250 may be for long distance obstacle observation in terms of both visually observable objects and their depth measurements. The sensor rack 260 may include sensors responsible for detecting obstacles in a closer distance to the vehicle 240. The sensors racks installed on the sides of the truck may be for observing obstacles on both sides of the vehicle 240. The back of the truck may also have a rack with sensors designated for observe what is in the rare end of the vehicle. In this manner, the truck is made aware of its surroundings so that any autonomous driving decision may be made according to the surrounding situation.

Figure 3A:
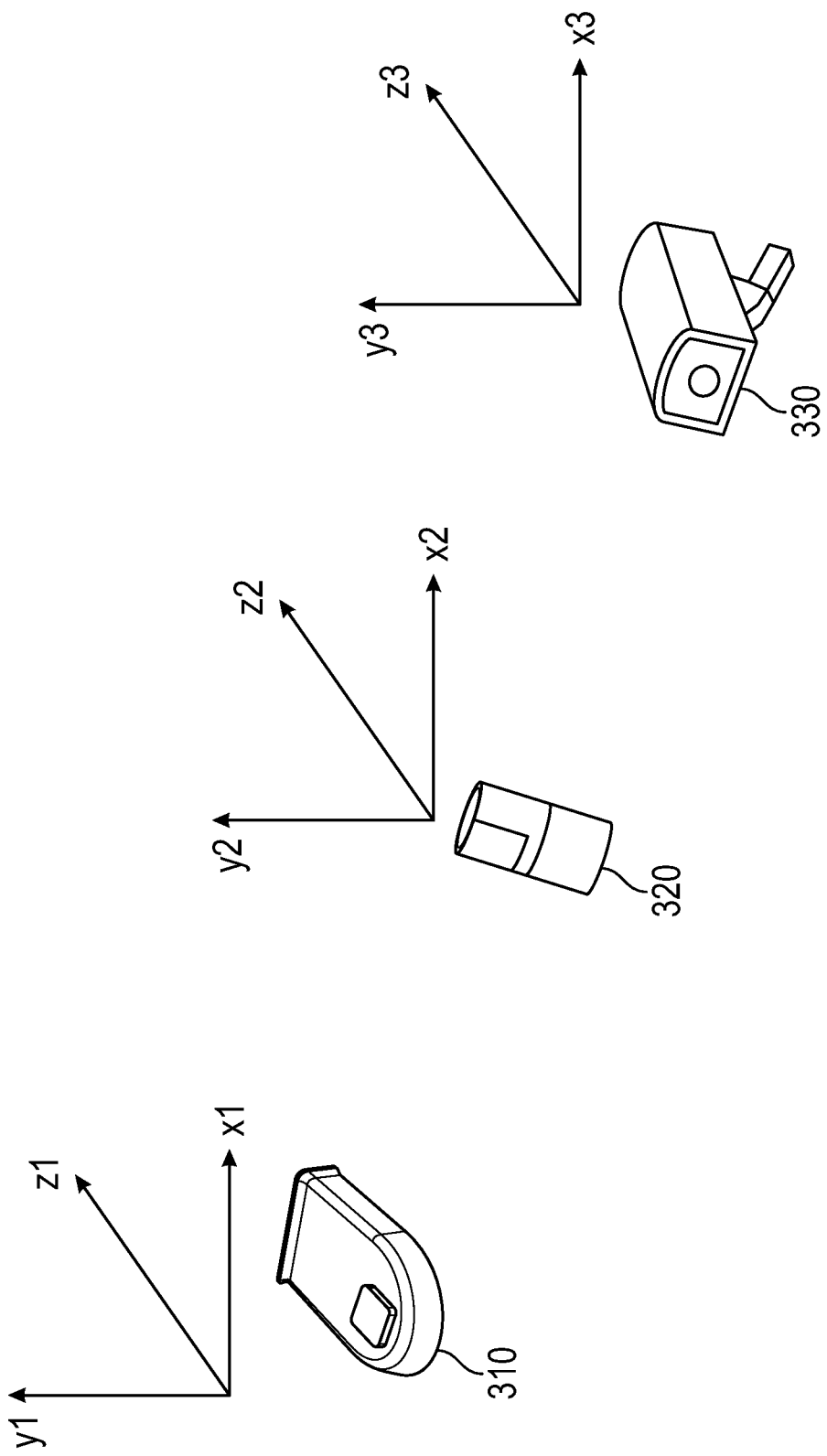
FIGS. 3A-3B show exemplary configurations of different types of sensors calibrated separately in separate coordinate systems and transformations thereof.
Figure 3B:
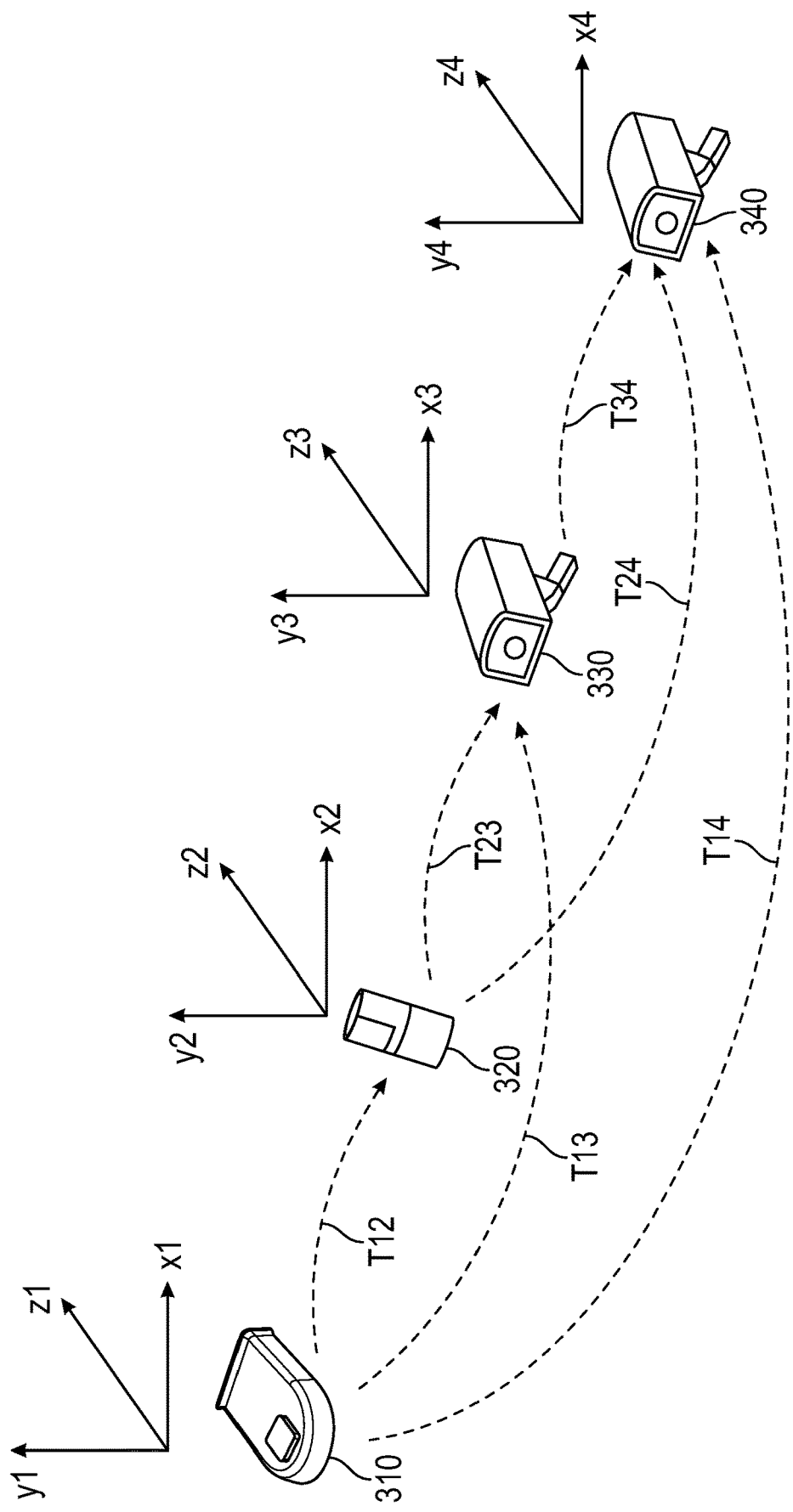

When such sensor racks are installed on a vehicle for their respective roles to collect needed information, it is essential that such sensors are operational to provide reliable and accurate information needed when the vehicle is on the move. As discussed herein, traditionally, due to diversity of sensor types and the difference in operational principles, each sensor is calibrated individually. Pair wise transformation matrices have to be computed for each pair of sensors in a separate manner. As a consequence, the residual error left in the sensor-pair calibration may accumulate in the combination calibration, which can cause problems. This is illustrated in FIGS. 3A-3B, which show exemplary configurations of different types of sensors calibrated separately in separate coordinate systems and transformations thereof. In FIG. 3A, there are three exemplary sensors 310 (e.g., a radar sensor), 320 (e.g., a LiDAR sensor), and 330 (e.g., a camera sensor), each of which is calibrated separately with respect to its own coordinate system. For instance, sensor 310 (a radar) operates in coordinate system X1-Y1-Z1, sensor 320 (LiDAR) operates in coordinate system X2-Y2-Z2, and sensor 330 (camera) operates in coordinate system X3-Y3-Z3. FIG. 3B shows four sensors and similarly each of the sensors therein operates in its own coordinate system X1-Y1-Z1, X2-Y2-Z2, X3-Y3-Z3, and X4-Y4-Z4, respectively.

To allow different sensors to interoperate with each other, transformation matrices for different pairs of sensors may be derived. As shown, a transformation matrix T12 may be for converting points in corresponding coordinate systems used by sensor 310 and sensor 320. Such a transformation matrix is derived based on two sets of corresponding points in these two coordinate systems. In traditional art, such corresponding points may be determined in separate calibration processes applied to the two sensors, which can be time consuming. In an example with 4 sensors, as shown in FIG. 3B, there will be another 5 transformation matrices (T23, T34, T13, T14, and T24) that need to be computed. When there are more than two sensors, the processes of calibrating individual sensors and then the pair-wise transformation matrices will take a significant amount of time and labor intensive. In addition, the residual errors from the respective calibrations of individual sensors may be accumulated while computing the transformation matrices.

Figure 4A:
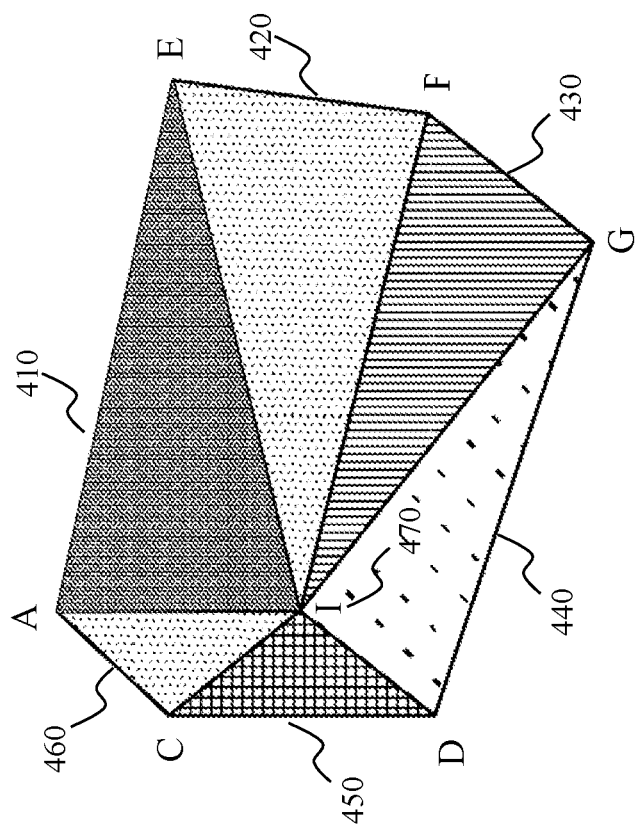
FIGS. 4A-4B show an exemplary integrated fiducial marker for simultaneously calibrating multiple sensors, in accordance with an embodiment of the present teaching.
Figure 4B:
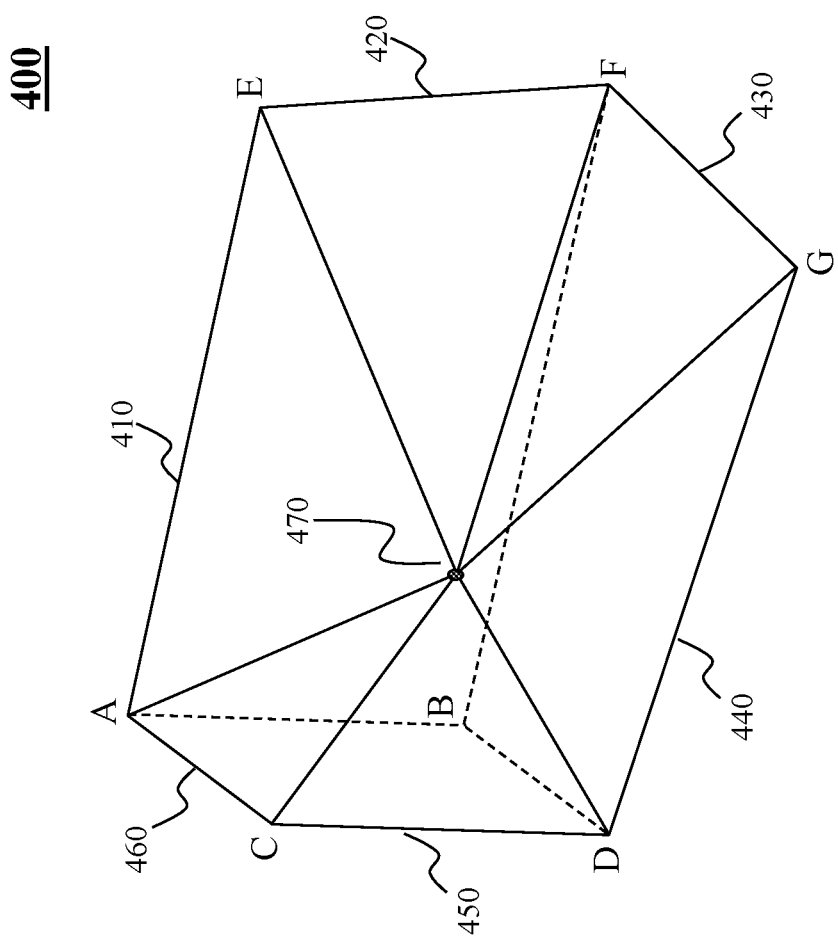

FIGS. 4A-4B show an exemplary fiducial marker 400 for simultaneously calibrating multiple sensors, in accordance with an embodiment of the present teaching. FIG. 4A shows an exemplary 3D fiducial marker 400 corresponds to a 3D structure with a plurality of surfaces, with 6 frontal surfaces (410, 420, 430, 440, 450, and 460) intersecting at a center point I 470. In this illustrated embodiments, the 3D structure 410 is a convex 3D structure with the interaction center point 470 as a protruded point on 410. In some embodiments, the plurality services may also intersect in a way to form a concave 3D structure (not shown) where the intersecting point 470 is correspondingly a depressed point in the concave 3D structure. FIG. 4B provides an exemplary corresponding line drawing version of the 3D fiducial marker 400, which shows 7 vertices (A, B, C, D, E, F, and G) that form 9 surfaces, including the frontal surfaces and surfaces in the back formed by vertices ACDB, AEFB, and BFGD. In this exemplary embodiment, each of the frontal surfaces is designed to have a different color or texture. The frontal surfaces intersect at the center point I (470), which in this embodiment is a structurally protruded point at the intersection of the frontal surfaces.

The center point 470 serves as a feature point on the fiducial marker 400 that can be recognized or identified by different sensors. As all sensors can recognize the same point (the center point 470), their respective measurements are comparable. Based on the construction of the fiducial marker 400, as each of the frontal surfaces is of a different color or texture, the center point 470 may be visually identified from an image of the marker by locating the intersection of different color patches. With respect to a depth based sensor such as a LiDAR, the center point 470 may be identified by analyzing the scanned depth values of the marker and finding a singular (local minimum) depth value in the depth map. Although this exemplary fiducial marker is constructed with a center point protruded, other constructs may also be possible. For example, instead of protruded, the center point 470 may also be concaved, i.e., the frontal surfaces are inward towards the interior of the 3D structure (not shown). In this case, the concaved center point can still be visually identified based on color/texture analysis. At the same time, as the depth value of the center point is corresponding to a local maximum value, it can still be identified. As both a visual based sensor and a depth based sensor can readily identify the center point I 470 on the fiducial marker 400 as a feature point, the marker 400 can be used to calibrate different types of sensors at the same time. As different sensors identify the same feature point on the same marker, the 3D points in their respective coordinate systems are corresponding points and can be used to determine the transformation matrix between the two coordinate systems.

Figure 4C:
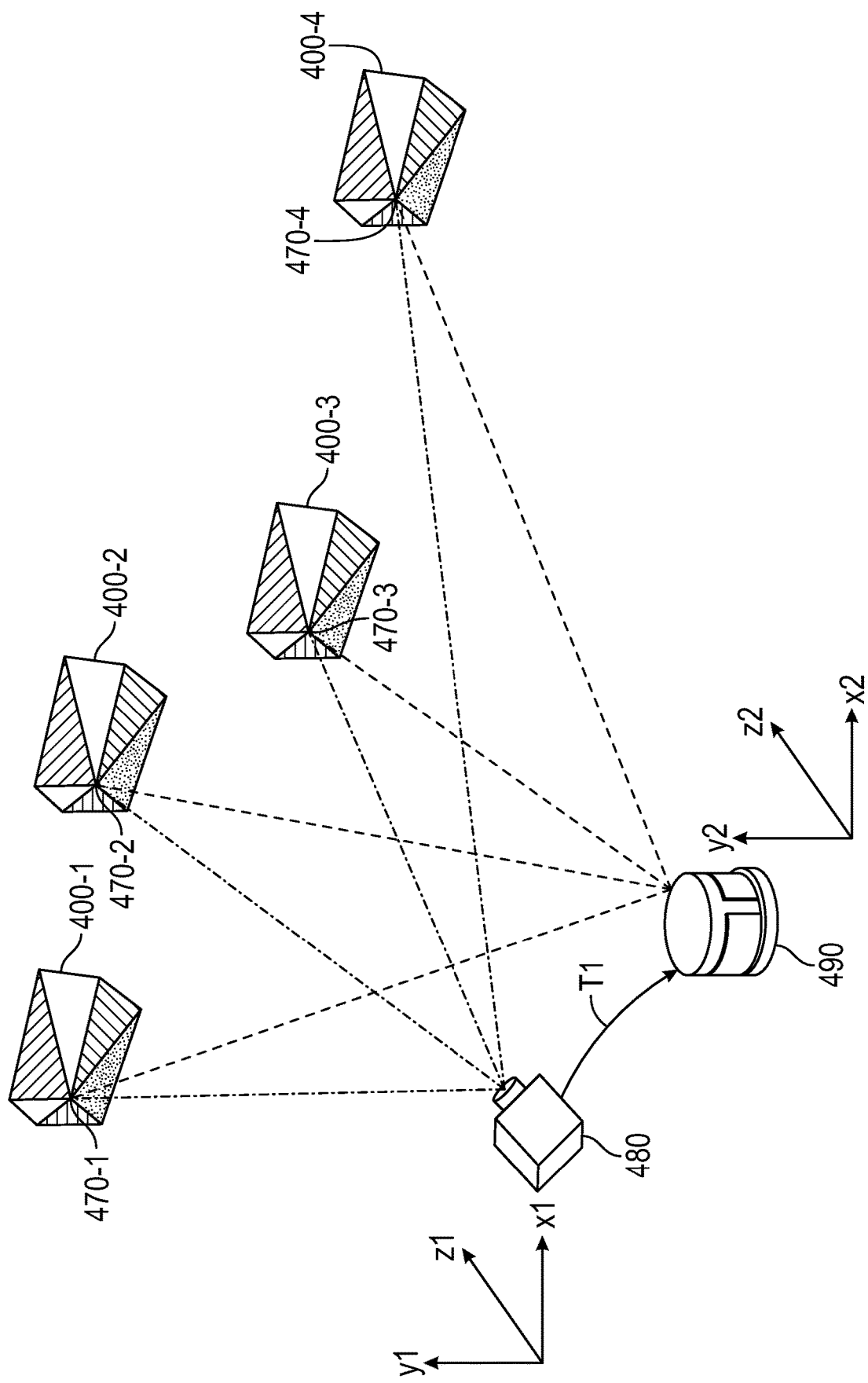
FIG. 4C shows an exemplary setting for calibrating sensors and deriving a transformation matrix for a pair of sensors using integrated fiducial markers, in accordance with an embodiment of the present teaching.

FIG. 4C shows an exemplary setting for deriving a transformation matrix between two sensors while simultaneously calibrating the sensors using fiducial markers, in accordance with an embodiment of the present teaching. As discussed herein, to determine a transformation matrix between two coordinate systems for two sensors, at least 4 feature points from each coordinate system that are not all on the same plane are needed. The exemplary embodiment shown in FIG. 4C provides four fiducial markers, i.e., 400-1, 400-2, 400-3, and 400-4, which are distributed in space so that their center points are not all on the same 3D plane. This example shows two sensors, camera 480 and LiDAR 490, that can be simultaneously calibrated using the integrated set of four fiducial markers based on their respective center points 470-1, 470-2, 470-3, and 470-4. Each sensor will detect four 3D points in their own respective coordinate systems $X1$-$Y1$-$Z1$ and $X2$-$Y2$-$Z2$, corresponding to the four center points on the four fiducial markers. For example, based on an acquired image of each of the markers, the camera sensor 480 (or its image processing algorithm) may locate the corresponding center point by identifying the intersection point of different color/texture patches in the image. Similarly, the LiDAR sensor 490 (or its signal processing algorithm) may also locate the center point of each of the fiducial markers by identifying a peak depth point in a scanned data set.

The four center points detected by camera 480 from its visual sensor data forms a first set of 3D points in coordinate system $X1$-$Y1$-$Z1$. The four center points detected by LiDAR 490 from its scan data forms a second set of 3D points in coordinate system $X2$-$Y2$-$Z2$. The two sets of points are corresponding points and can then be used to compute the transformation matrix T1. While this example illustrates the concept using four fiducial markers (not on the same surface), more fiducial markers may also be used.

Figure 5A:
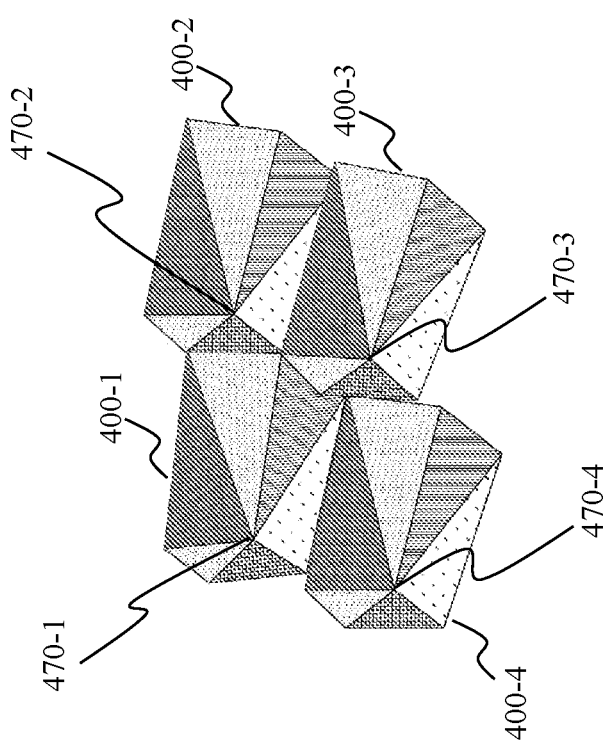

FIGS. 5A-5B show a different configuration of integrating different fiducial markers for facilitating multi-sensor calibration and derivation of transformation matrices, in accordance with an embodiment of the present teaching. In this example, instead of spatially distributing four fiducial markers apart, as shown in FIG. 5A, four (or more) fiducial markers, i.e., 400-1, 400-2, 400-3, and 400-4, may be stacked in a way that not all center points (470-1, 470-2, 470-3, and 470-4) are on the same plane. The stacked multiple fiducial markers may be used to calibrate multiple sensors and derive pair-wise transformation matrices. One example is shown in FIG. 5B, in accordance with an embodiment of the present teaching. Compared with what is shown in FIG. 4C, where four fiducial markers are spatially spaced, the stacked cluster of fiducial markers as shown in FIG. 5B occupy less space, easier to deploy, and allow sensors to gather data for identifying corresponding center points in a narrower field of view. However, a high level of resolution in terms of recognizing feature points are needed.

As discussed herein, the construct of the 3D fiducial marker 400 allows not only simultaneously calibrate multiple sensors but also calibration of different types of sensors (such as visual and depth based sensors). There are other types of sensors that may operate differently. For instance, a radar device (sensor) operates to detect distance to an object by emitting a concentrated radio wave and then listening for echo caused by electromagnetic energy bounced back from a surface of an object in the path of the radio wave. To equip the fiducial marker 400 with the ability to calibrate a radar sensor, he present teaching discloses additional means to be incorporated with the fiducial marker 400 to allow a further integrated marker for reflecting radio waves.

Figure 6C:
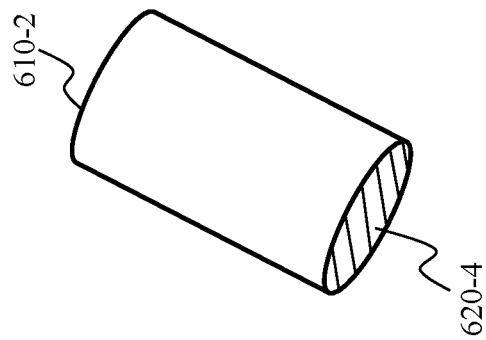
FIGS. 6A-6C show different exemplary 3D structures constructed with a metal surface, in accordance with an embodiment of the present teaching.
Figure 6B:
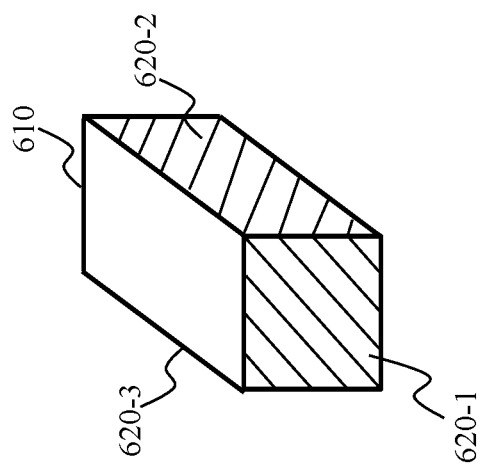
Figure 6A:
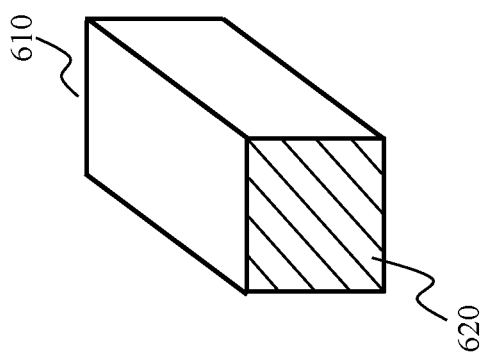

FIG. 6A shows an exemplary 3D structure 610 constructed with a metal surface, in accordance with an embodiment of the present teaching. In this example, the 3D structure 610 corresponds to a rectangular prism with a (front) surface 620 having metal thereon for receiving radio waves and bouncing back electromagnetic energy. It is also possible to cover more surfaces on the 3D structure with metal, either partially or fully. One embodiment is shown in FIG. 6B, in which three sides (620-1, 620-2, and 620-3) of the 3D structure 610 has metal surfaces. In addition, although this illustrated exemplary embodiment is a rectangular prism, the 3D structure may take other different shapes. One exemplary shape may be a cylindrical prism 610-2, as shown in FIG. 6C, with both ends truncated and the front cross section 620-4 covered with metal. In some embodiments, the curved cylinder surface of 610-2 may also be fully or partially covered with metal (not shown). In another embodiment, instead of a truncated the front cross section, the front may not be truncated with a round end covered with metal (not shown).

Figure 6D:
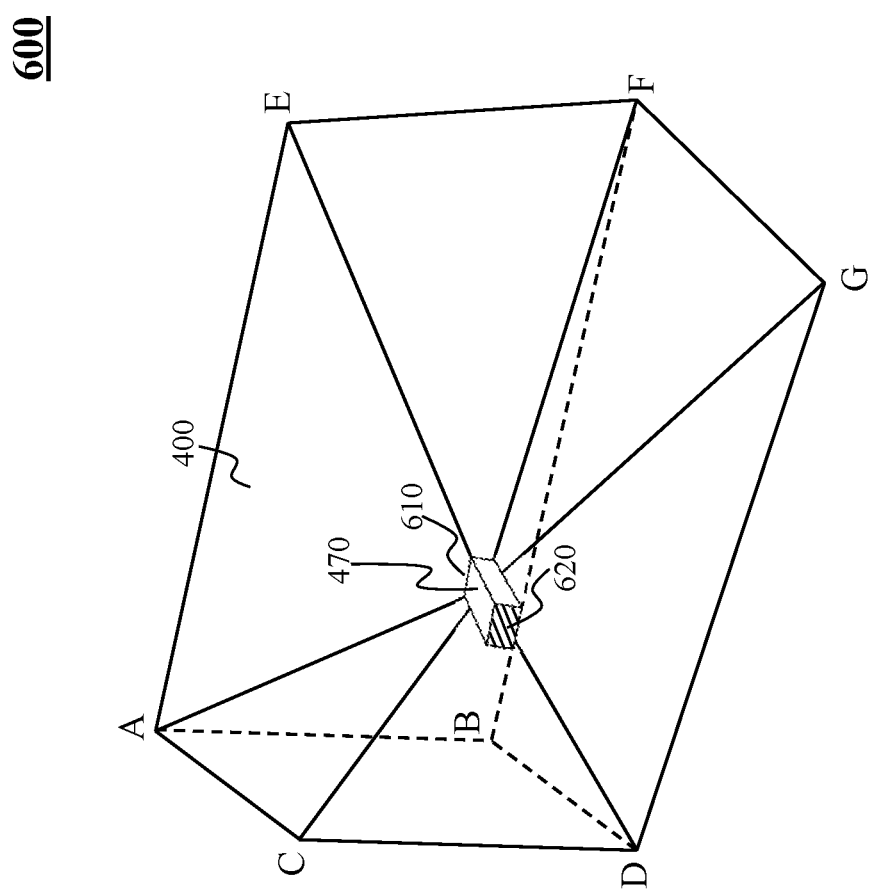
FIG. 6D illustrates an exemplary integrated fiducial marker with a 3D structure attached in the front having a metal surface to reflect signals, in accordance with an embodiment of the present teaching.

FIG. 6D shows an integrated fiducial marker 600 having the 3D structure 610 integrated with the fiducial marker 400, in accordance with an embodiment of the present teaching. As illustrated, the 3D structure 610 is attached to the fiducial marker 400 at the center point location 470. This form of integration may not significantly affect the identification of the center point 470 in visual/depth based feature point recognition. In the visual mode, the intersection point of different color patches in an 2D image may still be approximately estimated with accuracy, particularly given the known knowledge that each surface has a vanishing point. Given that, even if the vanishing point is not visible because of the presence of the 3D structure 610, it can be estimated based on the boundary lines of each color patch. In estimating the center point based on a depth map (e.g., in case of LiDAR), as the dimension of the 3D structure 610 is relatively small, the identified peak depth value on the front surface of the 3D structure 610 remains to be the local minimum depth value which is approximately corresponding to the location of the actual center point 470. To estimate the precise center point location 470, it can be accurately inferred from the depth of the front surface of the 3D structure 610.

Figure 6E:
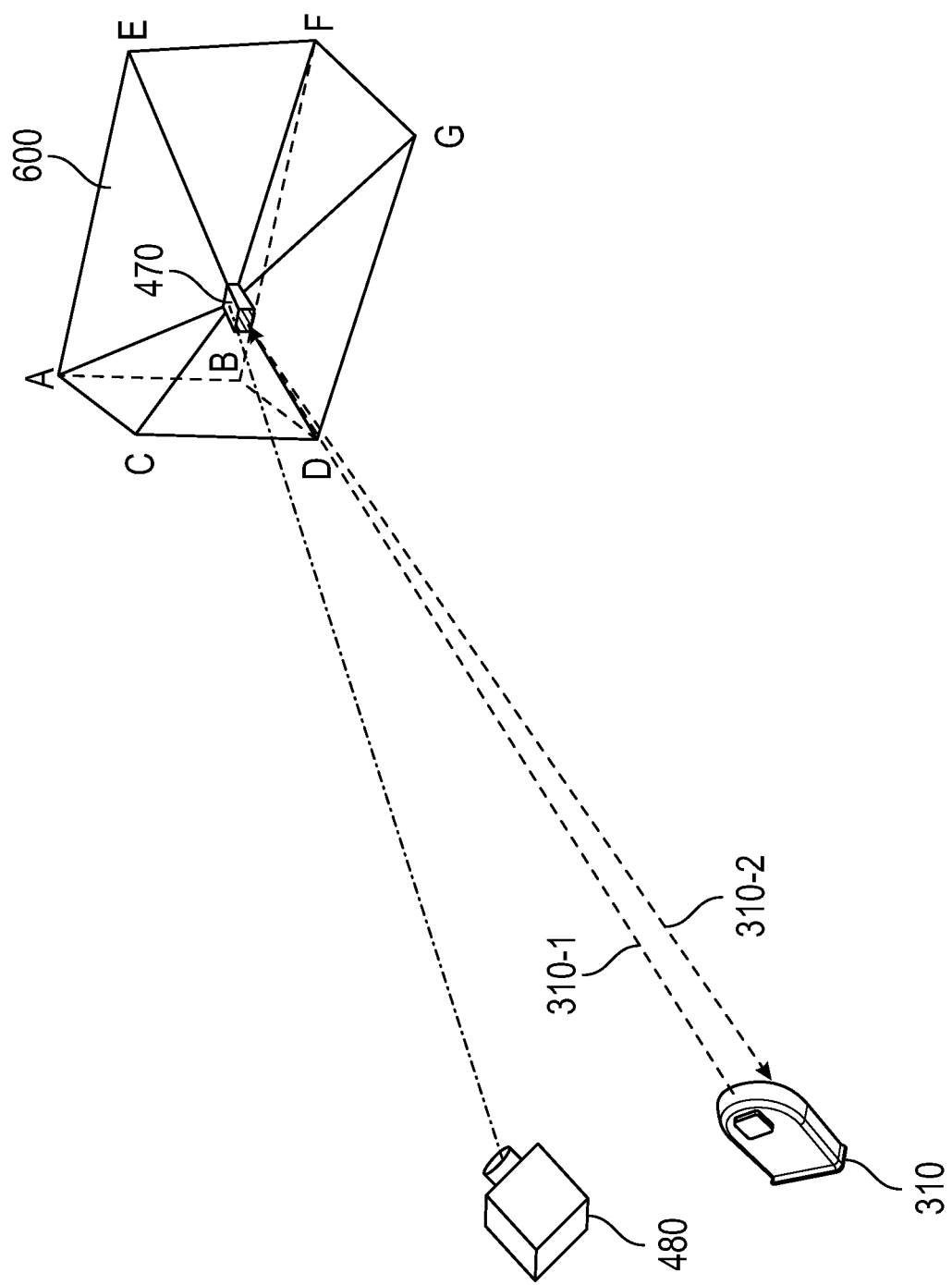
FIG. 6E shows an exemplary scheme of deploying an integrated fiducial marker having a 3D structure attached to the front with a metal surface to enable simultaneously calibration of multiple types of sensors, in accordance with an embodiment of the present teaching.

With the integrated fiducial marker 600, FIG. 6E shows a setting in which different types of sensors may be calibrated using the same integrated fiducial marker 600. As shown, there are two sensors, one is, e.g., a camera 480 and the other, e.g., a radar sensor 310. As discussed herein, to calibrate camera 480, images of the marker 600 are captured and analyzed to identify different color patches of different sides in different colors/textures of the marker 600 in order to estimate the intersection point. On the other hand, to calibrate the radar sensor 310, the radar emits a concentrated radio wave 310-1 and then listening for any echo 310-2 caused by electromagnetic energy bounced back from the surface 620 of the 3D structure 610 (now part of the integrated fiducial marker 600). Based on the echoes, the location of the center point 470 may be determined in accordance with the known radar technologies. When at least 4 integrated fiducial markers are provided in a way that their center points are not on the same plane (either in a distributed manner such as shown in FIG. 4C or in a stacked manner as shown in FIG. 5B), a transformation matrix for the pair of sensors may be determined based on two corresponding sets of feature (center) points, as discussed herein.

Figure 6F:
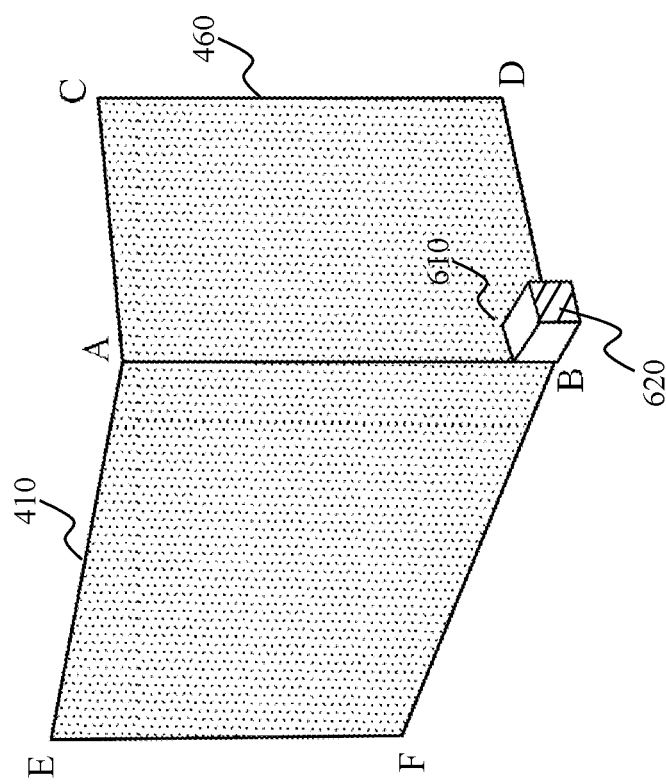
FIG. 6F illustrates a different exemplary integrated fiducial marker with a 3D structure attached in the back having a metal surface to reflect signals, in accordance with an embodiment of the present teaching.

Alternative ways to incorporate 3D structure 610 may also be used to form an integrated fiducial marker. FIG. 6F illustrates a different exemplary scheme to incorporate the 3D structure 610, in accordance with an embodiment of the present teaching. As seen in FIG. 6F, structure 610 in this case is attached to point B of the fiducial marker 400 in the back surface formed by vertices ACDB and with the metal surface facing outward.

Figure 6G:
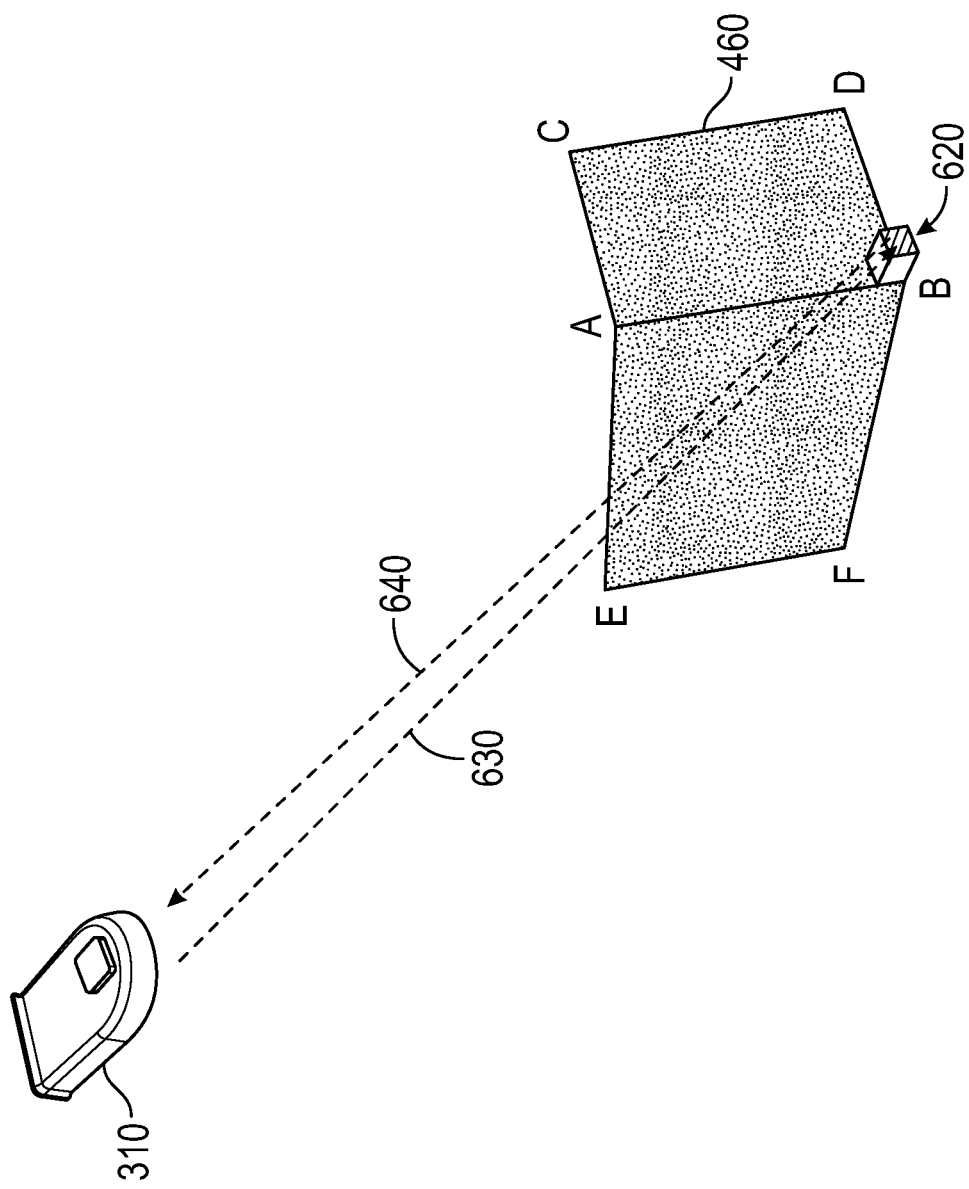
FIG. 6G shows a different scheme of deploying an integrated fiducial marker having a 3D structure attached to the back with a metal surface to enable simultaneously calibration of multiple types of sensors, in accordance with an embodiment of the present teaching.

FIG. 6G depicts a configuration for calibrating a radar sensor based on an integrated fiducial marker with a reflective metal surface in the back of the marker, in accordance with an embodiment of the present teaching. In this example, a 3D structure with a metal surface is incorporated at vertex B in the back surface 460 of the fiducial marker 400. The radar sensor emits radio waves (630). When the radio waves reaches the metal surface 620 in the back of the marker 400, the electromagnetic energy is bounced back in direction 640 and received by the radar. The time it takes for the radar to receive the bounced electromagnetic energy can then be used to determine the distance between the radar and point B of the marker 400. In some embodiments, when the dimension of the marker 400 is known, the center point I 470 in the front of the marker 400 may accordingly be estimated and can be used as a corresponding feature point in estimating a transformation matrix with respect to another sensor. Conversely, if another sensor being calibrated simultaneously with the radar sensor detects the center point I 470 of fiducial marker 400, it may infer the 3D location of point B based on detected center point 470 and the known dimension of the 3D structure 610.

To use a fiducial marker (either 400 or 600) for calibration or deriving pair-wise transformation matrices for sensor pairs, a vehicle with different sensors deployed thereon may be required to be within a certain distance from the markers. In some situations, the vehicle may also need to be oriented in a certain way with respect to the markers. Such requirements may be met when calibrations are done in a static setting, i.e., either the vehicle can be manually driven to a certain designated position with respect to the markers for the calibration or markers may be arranged around the parking vehicle to satisfy the requirements. The calibration may then be initiated manually once the vehicle and the markers are in appropriate relative positions. However, a more realistic situation, especially with autonomous driving vehicles, is the need to calibrate sensors in a dynamic situation whenever the need is detected, e.g., when a vehicle is on travel without access to a specialized environment with assistance from specialized personnel. In such situations, as the personnel who has knowledge of the required spatial configuration between the vehicle and markers is not available, there is a need for enable the vehicle to automatically detecting the presence of fiducial markers, orienting itself with respect to the detected fiducial markers in a certain way, and initiating the calibration process once the vehicle is positioned relative to the markers in some required spatial configuration.

Figure 7A:
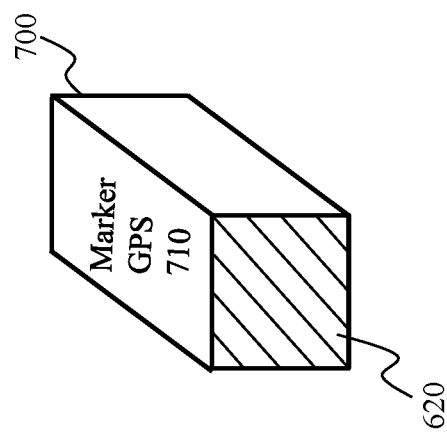
FIG. 7A depicts an exemplary 3D structure with a metal surface and a marker GPS device incorporated therein, in accordance with an embodiment of the present teaching.

The present teaching discloses an exemplary mechanism that enables a vehicle to achieve automated initiation of calibration process. FIG. 7A shows an exemplary 3D structure 700 with a marker GPS 710 embedded therein, in accordance with an embodiment of the present teaching. As illustrated in this embodiment, 3D structure 700 has not only a metal surface (as in 3D structure 600 shown in FIG. 6A) but also a marker GPS 710 to be used to enable a vehicle having its own GPS therein to be able to estimate a distance between the marker GPS 710 and the vehicle based on signals from the marker GPS 710. The improved 3D structure 700 is to be incorporated with fiducial marker 400 (e.g., in a similar way as shown in FIG. 6D) to form an integrated fiducial marker 750 (shown in FIG. 7D).

Figure 7B:
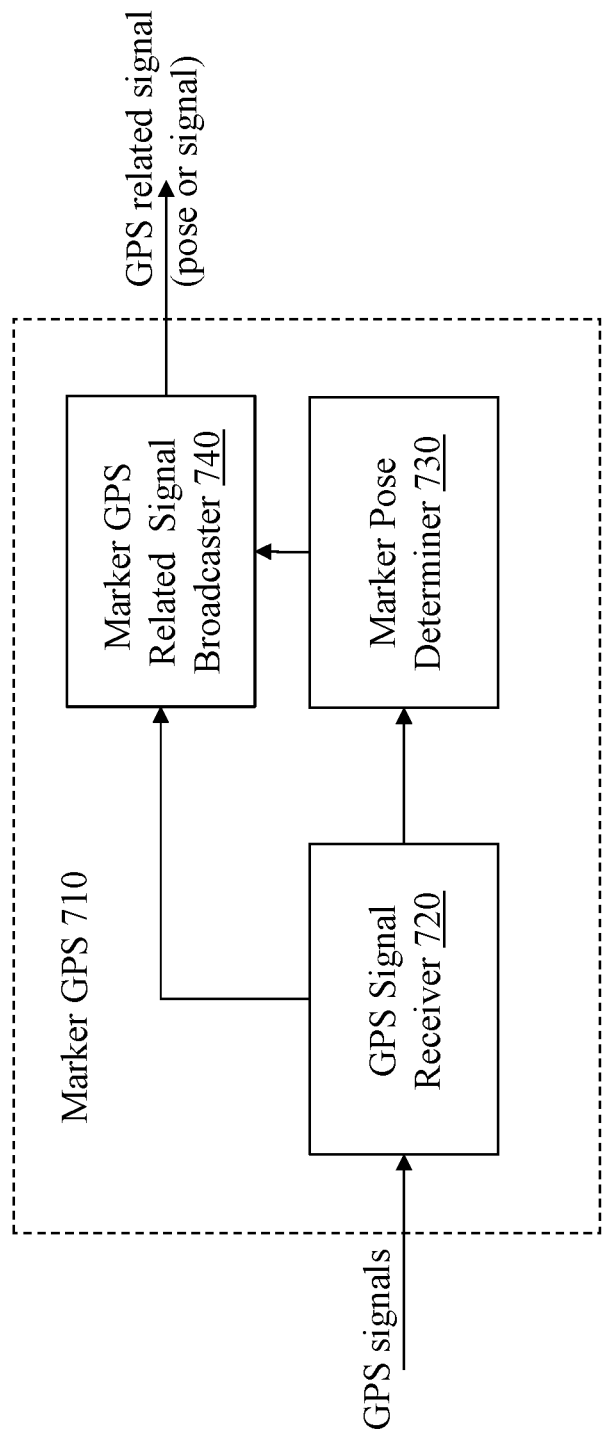
FIG. 7B depicts an exemplary internal high level system diagram of a marker GPS device, in accordance with an embodiment of the present teaching.

FIG. 7B depicts an exemplary internal high level construct of the marker GPS 710, in accordance with an embodiment of the present teaching. In this illustrated embodiment, the marker GPS 710 comprises a GPS signal receiver 720, a marker pose determiner 730, and a marker GPS related signal broadcaster 740. The GPS signal receiver 720 is to receive GPS signals from, e.g., a satellite, on information which can be used to determine the geolocation of the marker. The marker pose determiner 730 is to determine, based on the received GPS signals, the pose of the 3D structure 700. The pose includes a geolocation and orientation of the underlying structure. Such orientation may represent the directionality of the 3D structure 700, e.g., facing northeast or southwest. The marker GPS related signal broadcaster 740 is to broadcast information related to the geo information of the marker.

Figure 7C:
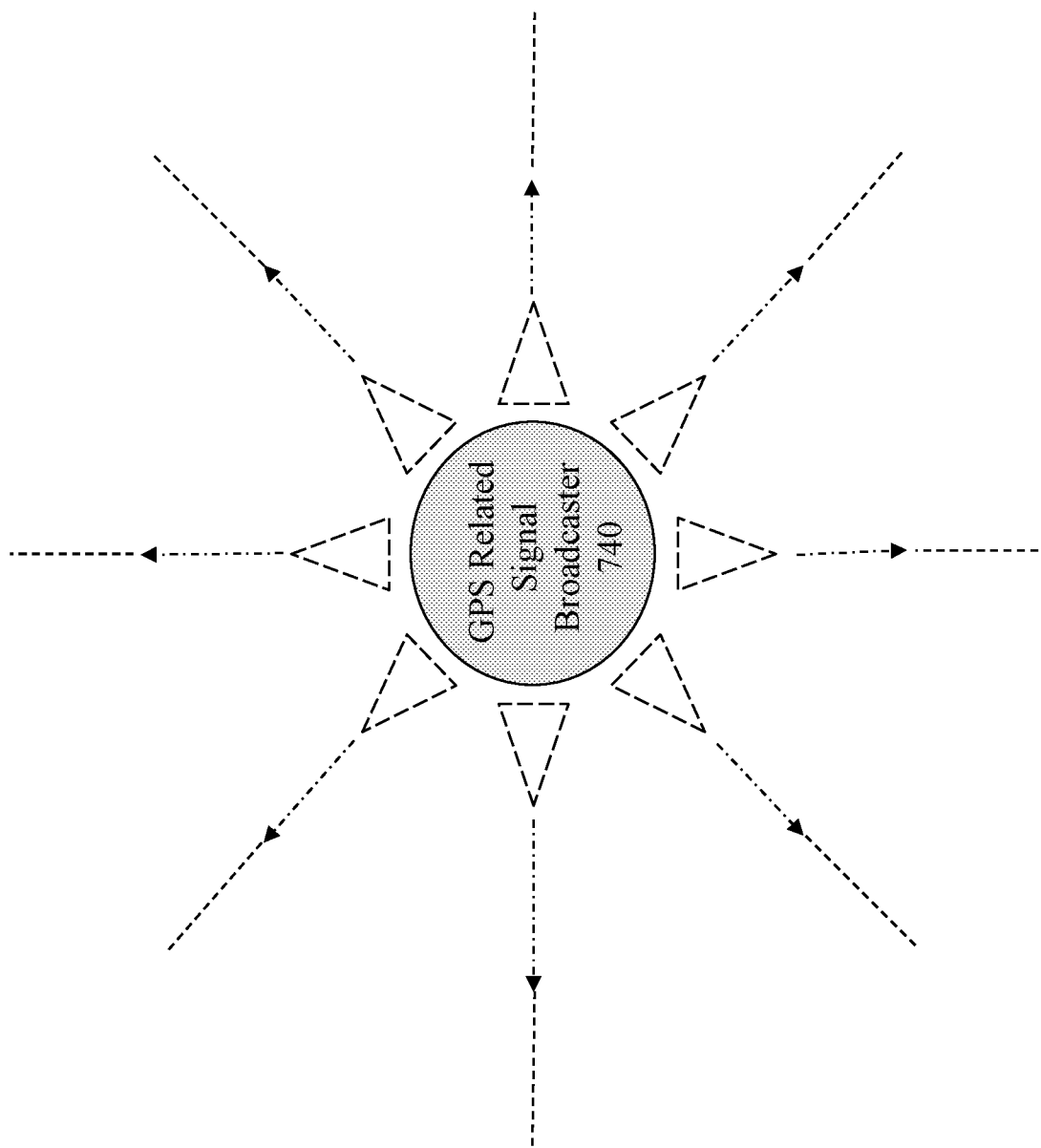
FIG. 7C illustrates an exemplary pattern of broadcasting a GPS related signal from a marker GPS device, in accordance with an embodiment of the present teaching.

In some embodiments, the orientation of the 3D structure 700 may be determined based on the received GPS signals. In some embodiments, the orientation may need to be determined based on additional information, e.g., information from a compass or an inertial measurement unit or IMU on the 3D structure 700. Both geolocation and orientation information are important to enable a vehicle to not only determine whether it is within a needed distance to initiate calibration but also how the vehicle may be oriented to carry out the calibration for relevant sensors. Once the pose of the 3D structure 700 is determined, the marker pose determiner 730 sends the estimated pose information to the marker GPS related signal broadcaster 740 so that the pose information may be transmitted or broadcast so that passing vehicles to receive such signals. In some embodiments, the marker pose information may be broadcast in some selected or predetermined directions. For example, the marker pose may be transmitted along the direction extended out from the metal surface (or frontal surfaces) of the integrated fiducial marker 750. When the pose signals are transmitted in a limited directions (or scope), it may ensure that any vehicle that receives the signals is within a limited field of view. In some embodiments, the marker pose may also be broadcast in a wider range or in all directions as shown in FIG. 7C. Such operational parameters may be determined based on application needs.

In some embodiments, instead of determining the marker pose by the marker pose determiner 730, the GPS signal receiver 720 may, upon receiving the GPS signal, send the received GPS signal directly to the marker GPS related signal broadcaster 740. In this case, what is broadcast to the passing vehicles is the marker GPS signal received by the GPS signal receiver 720 so that the passing vehicles may use the marker GPS signals broadcast by the marker to determine the geolocation of the marker. In some embodiments, additional information may also be broadcast together with the marker GPS signals to enable the passing vehicles to determine the pose (geolocation and orientation) of the marker. Thus, what is sent from the marker GPS related signal broadcaster 740 may be generally called marker GPS related signals, which may include either the estimated marker pose or the GPS signals with additional information needed in order to determine the pose of the marker by a recipient of the broadcast GPS related signal.

Figure 7D:
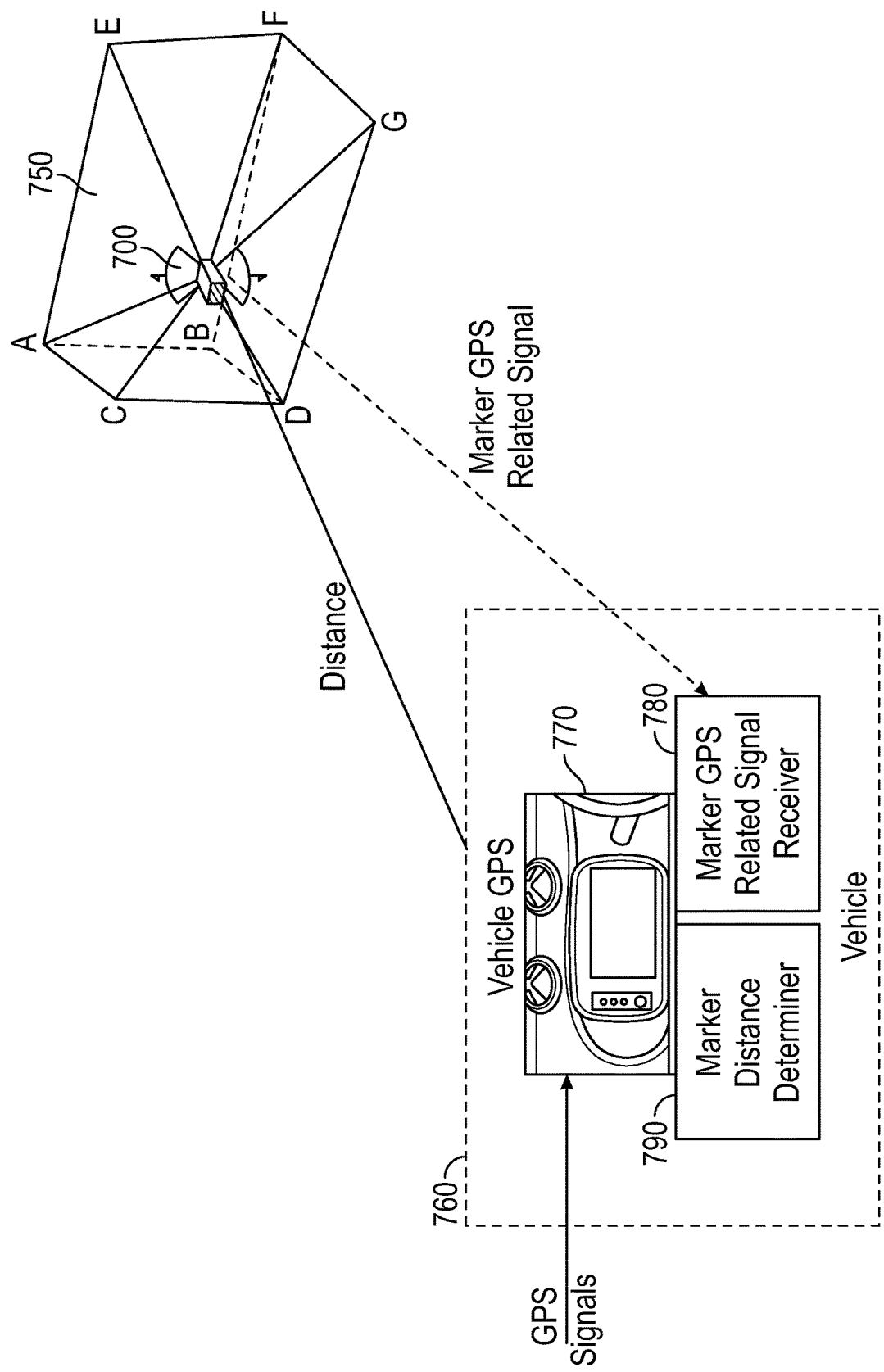
FIG. 7D depicts an exemplary scheme of automated initiation of calibrating multiple types of sensors of different types via an integrated fiducial marker with a GPS device incorporated therein, in accordance with an embodiment of the present teaching.

FIG. 7D illustrates an exemplary configuration of calibrating multiple sensors and deriving transformation matrices using an integrated fiducial marker 750 that enables automated initiation of the process, in accordance with an embodiment of the present teaching. In this setting, an integrated fiducial marker 750 is structured with the fiducial marker 400 combined with the 3D structure 700. As discussed herein, the fiducial marker 400 can be used to simultaneously calibrate both visual based on depth based sensors and make their measurements comparable so as to facilitate computations of pair wise transformation matrices while calibrating the sensors. The integrated fiducial marker 750 with the 3D structure 700 having both metal surface 620 and a marker GPS 710, enables calibration of radar sensors as well and supports automated calibration initiation.

In operation, a vehicle 760 equipped with its in-situ vehicle GPS 770 may receive GPS signals and derive information on its own geolocation and optionally its pose. At the same time, the marker GPS 710 in the integrated fiducial marker 750 also receives GPS signals and broadcast GPS related signals, which may be an estimated marker pose (including geolocation and orientation) and/or GPS related signals received with additional needed information to facilitate a determination of the marker pose by the vehicle 760. In this exemplary embodiment, the vehicle 760 includes a marker GPS related signal receiver 780 for receiving the marker GPS related signal transmitted by the marker GS related signal broadcaster 740. The received marker GPS related signal may then be used by the vehicle to obtain the marker pose information (which is either included in the marker GPS related signal or computed by the vehicle based on received marker GPS signal). With the vehicle pose and marker pose obtained, a marker distance determiner 790 in the vehicle may then compute a distance between the vehicle and the integrated fiducial marker 750. The vehicle may be configured to determine that calibration of sensors may not start until the vehicle is within a specified distance to the integrated fiducial marker 750. When the vehicle is within a specified distance from the integrated fiducial marker 750, the vehicle may then initiate the calibration. The specified distance threshold may be made dynamic, e.g., in the day light condition, the threshold may be higher and in a darker situation such as evening hours or raining days, a different larger threshold distance value may be used for the initiation.

In some embodiments, in addition to a distance that may be considered for determining when to initiate the calibration, a discrepancy in orientation between the integrated fiducial marker 750 and sensors to be calibrated may also be taken into account to ensure that the integrated fiducial marker 750 is in the field of view (or scan range) of the sensor. To determine the discrepancy, both the orientation of the fiducial marker 750 and that of the sensors to be calibrated need to be determined. In some embodiments, the orientation of the sensors to be calibrated may be determined by the vehicle based on, e.g., a known orientation of the vehicle and the configuration of sensors deployed on the vehicle. For instance, the orientation of the vehicle may be determined from the GPS signals received from a satellite (e.g., based on the moving trajectory of the vehicle). Based on that, the orientation of sensors to be calibrated may be determined based on the configuration of sensors that specifies the relative positions of such sensors with respect to the vehicle. The orientation of the integrated fiducial marker 750 may be received by the marker GPS related signal receiver 780 in the vehicle or determined by the vehicle based on received marker GPS related signal from the integrated fiducial marker 750. Based on the orientations of the marker and the sensors, the discrepancy may be determined and used to, e.g., adjust the pose of the vehicle in order for the vehicle to be oriented in a way that facilitate the needed calibration.

To enable computation of transformation matrix for a pair of sensors, multiple fiducial markers may be used together to provide at least 4 corresponding feature points simultaneously. At least one of such multiple markers corresponds to an integrated fiducial marker with GPS capabilities to facilitate passing vehicles to detect the presence of the cluster of multiple fiducial markers. The multiple fiducial markers may either be placed in a geographically close proximity to facilitate multi-sensor calibration as shown in FIG. 4C or stacked to achieve the same as shown in FIG. 5B. Such a 3D configuration of multiple fiducial markers may be used to calibrate sensors of the same or different types at the same time. Because different sensors are all calibrated based on the same marker, the measurements yielded in their respective coordinate systems are now comparable. Those corresponding feature points in different coordinate systems (the center points of the individual markers in the integrated fiducial marker) identified by different sensors may then be used to compute the pairwise transformation matrices.

The disclosed integrated fiducial markers may be deployed to replace the traditional calibration operations to save time, labor, and reduce accumulated error. In addition to that, the inclusion of the GPS device in the integrated fiducial marker also makes it possible to enable automated initiation of a calibration operation. Traditionally, to calibrate a sensor, the sensor is placed with respect to a target to be used for calibration in accordance with some spatial relationship, e.g., within a certain distance and within some defined field of view or scan range. With the integrated fiducial markers as disclosed herein, sensors to be calibrated may also need to be located in a close proximity with the markers with appropriate orientation. With the GPS device operational on the fiducial markers, as discussed herein, the process of ensuring that sensors to be calibrated are within a certain required distance from the markers and being oriented in a way to ensure calibration can be done automatically. This enables more flexible and dynamic ways for vehicles to have sensors deployed thereon to be calibrated in different situations.

Figure 8:
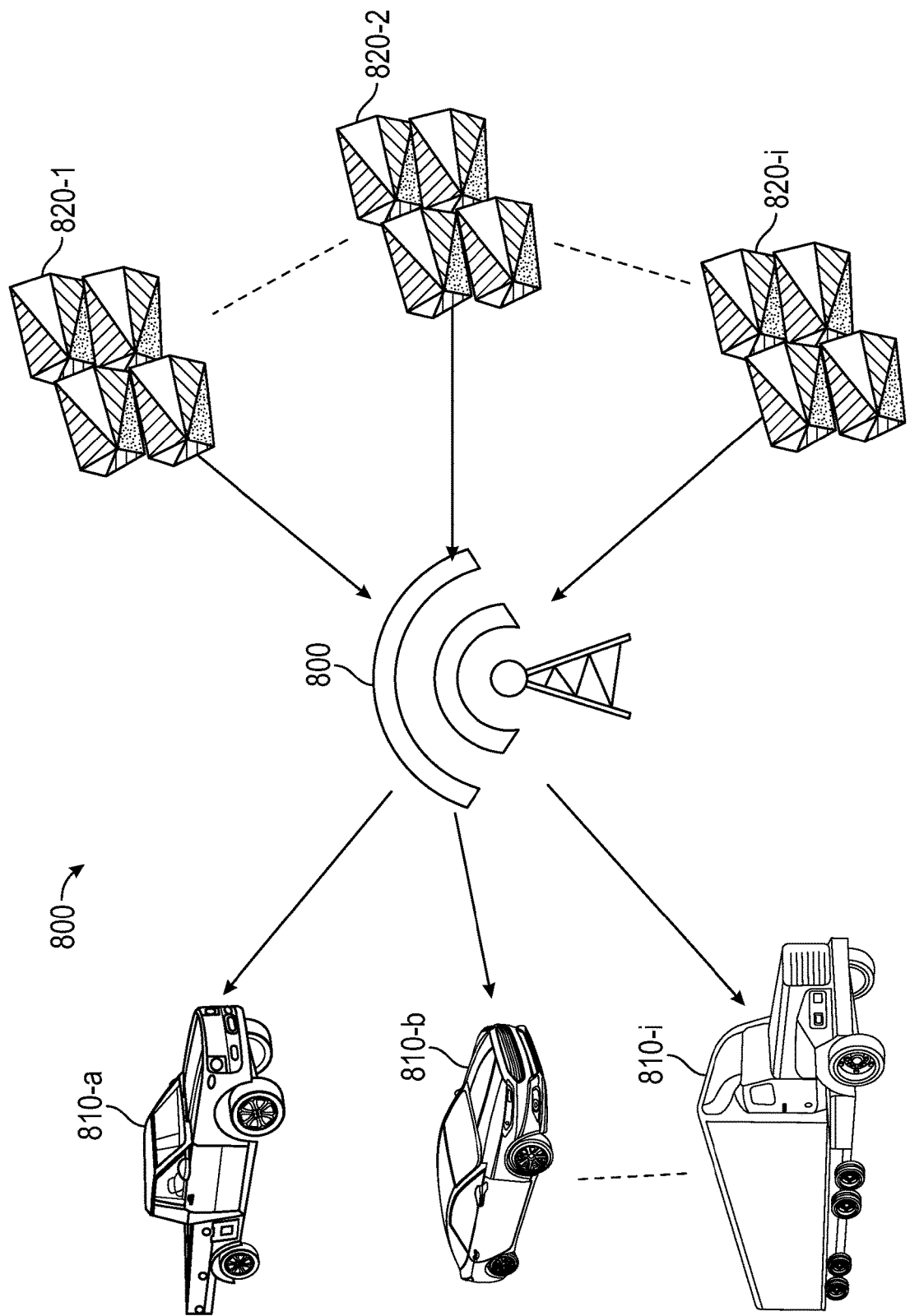
FIG. 8 depicts a general networked configuration in which moving vehicles detect presence of distributed integrated fiducial markers in order to automatically initiating calibration of sensors deployed thereon, in accordance with an embodiment of the present teaching.

FIG. 8 depicts a general networked framework 800 for dynamic sensor calibration, in accordance with an embodiment of the present teaching. In this networked configuration, vehicles 810-a, 810-b, . . . , 810-i (either moving or stationary) detect presence of distributed integrated fiducial markers 820-1, 820-2, . . . , 820-i in order to determine when to automatically initiate calibration of sensors deployed on the vehicles. In this configuration, there is no limit on the geographical locations of the various vehicles and the distributed integrated fiducial markers. For example, integrated fiducial markers may be geographically allocated at different appropriate locations, e.g., parking lot, rest areas along highways, residential areas, etc. of different cities, states, or even countries. Vehicles in different cities, states, or even countries may detect, while nearby (either passing by or reside close to) any of such distributed integrated fiducial markers, the presence of such markers and initiate, if needed, desired calibration. In this manner, calibration may be carried out in a need based manner at any place where integrated fiducial markers can be detected. Such detection may be carried out via network connections. In this configuration, as discussed herein, a vehicle with GPS operating therein receives GPS signals and determines its geolocation. At the same time, the marker signal receiver 780 (see FIG. 7D) in the vehicle may receive marker GPS related signals broadcast from different markers. For each received marker GPS related signal from a marker, the marker distance determiner 790 in the vehicle computes the distance between the vehicle and the marker based on the ego geolocation and the geolocation of the marker. Such computed distance may then be used to determine when the vehicle may initiate calibration.

Figure 9A:
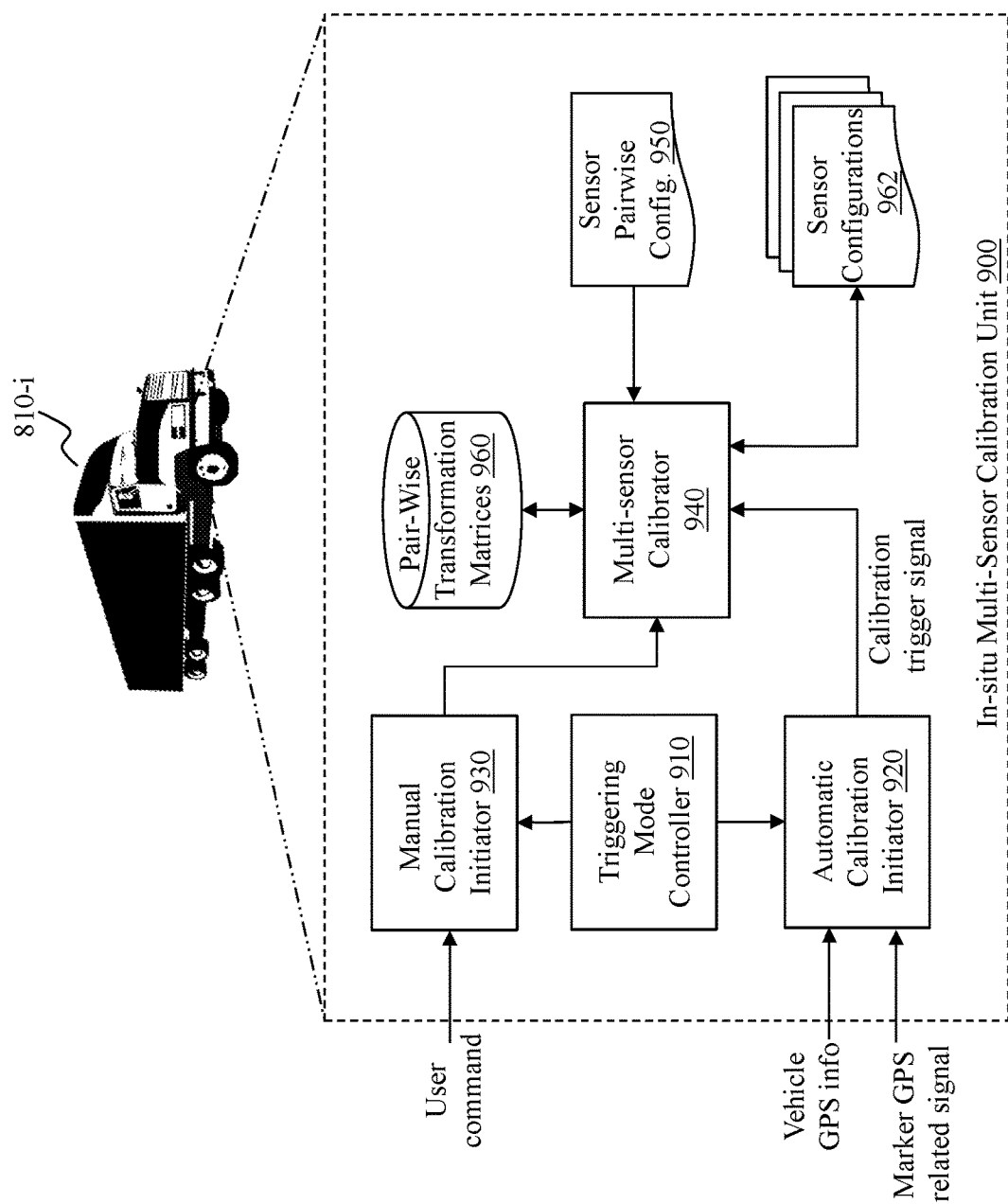
FIG. 9A depicts an exemplary high level system diagram of an in-situ multi-sensor calibration unit deployed in a vehicle, in accordance with an embodiment of the present teaching.

FIG. 9A depicts an exemplary high level system diagram of an in-situ multi-sensor calibration unit 900 deployed in a vehicle, in accordance with an embodiment of the present teaching. In this exemplary embodiment, the in-situ multi-sensor calibration unit 900 is deployed for controlling sensor calibration based on fiducial markers detected in accordance with the present teaching discussed herein. The exemplary in-situ multi-sensor calibration unit 900 is configured to allow different modes of operation to initiate multi-sensor calibration. One mode of operation is a manual triggering mode. The other mode is an automated mode based on automatically detected marker GPS related signals from integrated fiducial markers. The in-situ multi-sensor calibration unit 900 as illustrated herein includes a triggering mode controller 910, an automatic calibration initiator 920, a manual calibration initiator 930, a multi-sensor calibrator 940. In operation, the triggering mode controller 910 controls, based on the configured trigger mode, either the manual calibration initiator 930 or the automatic calibration initiator 920 to trigger, by sending a calibration trigger signal, the multi-sensor calibrator 940 to initiate the multi-sensor calibration.

In the manual mode, once activated by the trigger mode controller 920, the manual calibration initiator 930 interacts with a user and receives a command from the user for initiating the calibration process. In some embodiments, the user may provide the command with the knowledge that there are adequate number of fiducial markers within a certain range from the vehicle and/or the vehicle is oriented in such a way with respect to the markers that calibration of certain sensors can be facilitated. Upon receiving the manual command from the user, the manual calibration initiator 930 sends a trigger signal to the multi-sensor calibrator 940.

In an automated mode, the automatic calibration initiator 920 receives both GPS signals directed to the vehicle and the marker GPS related signals from one or more integrated fiducial markers. As discussed herein, based on these two received signals, a distance between the vehicle and the integrated fiducial marker from which the marker GPS related signal is received may be computed. In some embodiments, in addition to the geolocation of the marker, its pose including orientation, of the marker may also be determined. When the distance so determined satisfies certain pre-determined criteria, the automatic calibration initiator 920 sends a calibration trigger signal to the multi-sensor calibrator 940 to initiate the calibration.

Figure 9B:
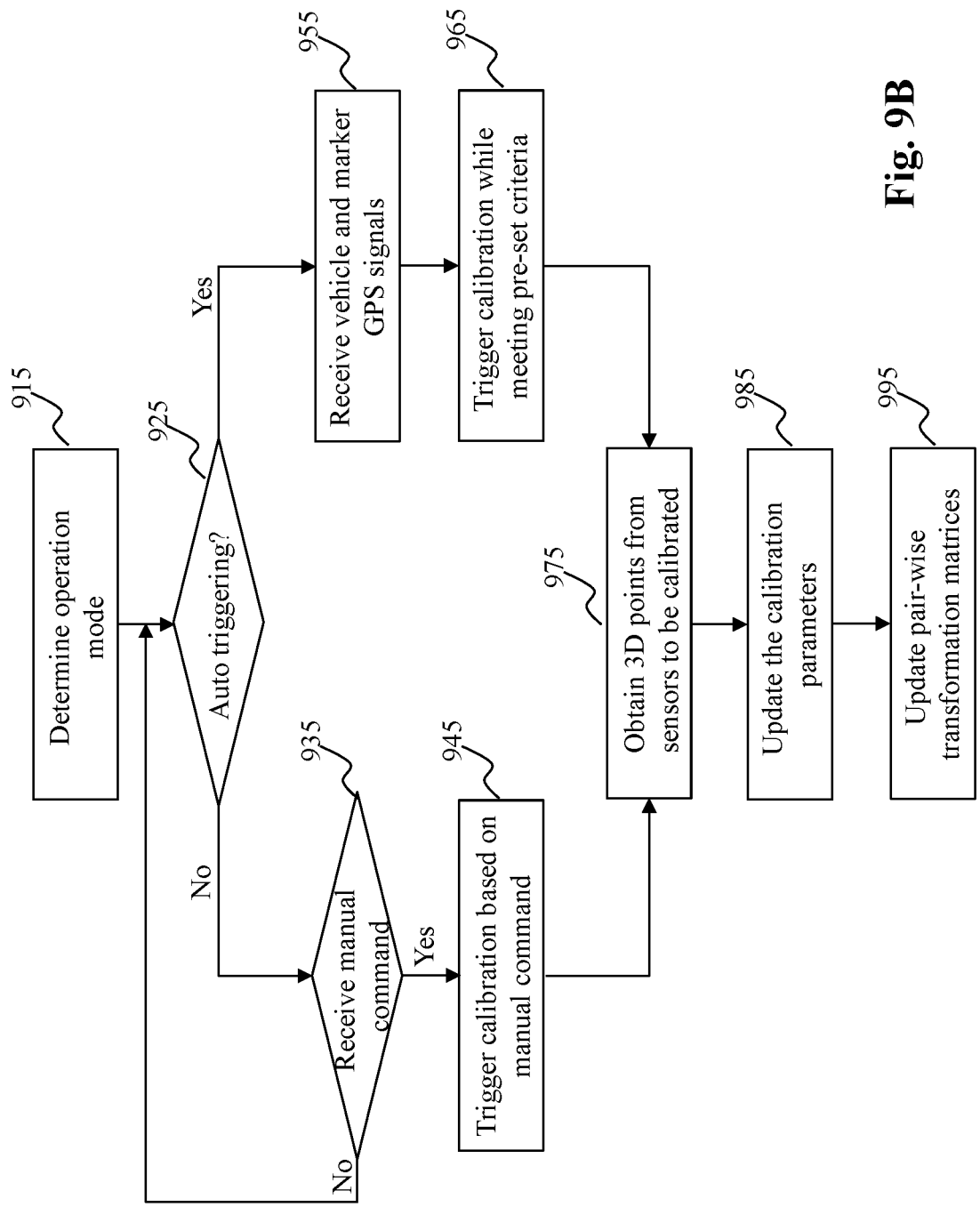
FIG. 9B is a flowchart of an exemplary process of an in-situ multi-sensor calibration unit in a vehicle, in accordance with an embodiment of the present teaching.

The multi-sensor calibrator 940, once triggered, may determine how to proceed to calibrate based on, e.g., which sensors need calibration, where such sensors are deployed on the vehicle (e.g., based on information stored in sensor configurations 960), which ones of these sensors are used in combination with other sensors (e.g., specified in sensor pairwise configuration 950 or pairwise transformation matrices specified in 960), etc. FIG. 9B is a flowchart of an exemplary process of the in-situ multi-sensor calibration unit 900 deployed in a vehicle, in accordance with an embodiment of the present teaching. In operation, the triggering mode controller 910 first access configuration information to decide, at 915, whether it is configured to operate in a manual or an automatic mode. If it is configured to operate in a manual mode, determined at 925, the triggering mode controller 910 activates the manual calibration initiator 930, which then proceeds to check, at 935, whether a manual command is received, e.g., from a user such as a driver or a maintenance personnel. It continues the check until a manual command is received. Upon receiving the manual command to start the calibration, the manual calibration initiator 930 triggers, at 945, the calibration by sending a triggering signal to the multi-sensor calibrator 940.

If it is configured to operate in an automatic mode, determined at 925, the triggering mode controller 910 activates the automatic calibration initiator 920. Upon being activated, the automatic calibration initiator 920 receives, at 955, both signals from the vehicle GPS and the marker GPS. The vehicle GPS signal indicates the geolocation of the vehicle determined by the vehicle GPS device, the marker GPS signal broadcast or transmitted by one or more integrated fiducial markers may indicate the geolocation(s) (and/or pose) of the marker(s). As discussed herein, in some embodiments, the marker's geolocations and orientations may be estimated at the vehicle. Based on such received GPS related information, the automatic calibration initiator 920 may then determine the distance between the vehicle and the detected markers, as discussed herein. When the distance between the vehicle and the detected markers satisfies a certain condition, the automatic calibration initiator 920 sends, at 965, a calibration trigger signal to the multi-sensor calibrator 940 to initiate the calibration process. In some embodiments, the condition to be met may also include orientation. In general, the automatic calibration initiator 920 initiates the calibration when criteria specified for calibration met all met.

Upon being triggered, either manually or automatically, the multi-sensor calibrator 940 controls the sensors to be calibrated to start the calibration and then obtains, at 975 from such sensors, the calibration parameters derived from the calibration and 3D points estimated of the corresponding center points 470 of the detected integrated fiducial markers from each such sensor in their respective coordinate systems. Based on the received calibration parameters, the multi-sensor calibrator 940 updates, at 985, the respective calibration parameters of such sensors. In addition, based on the 3D corresponding sets of points from different sensors, the multi-sensor calibrator 940 may then derive a transformation matrix for each pair of sensors and then save, at 995, the updated transformation matrices for such pairs in 960. Details related to the automatic calibration initiator 920 are provided below.

Figure 10A:
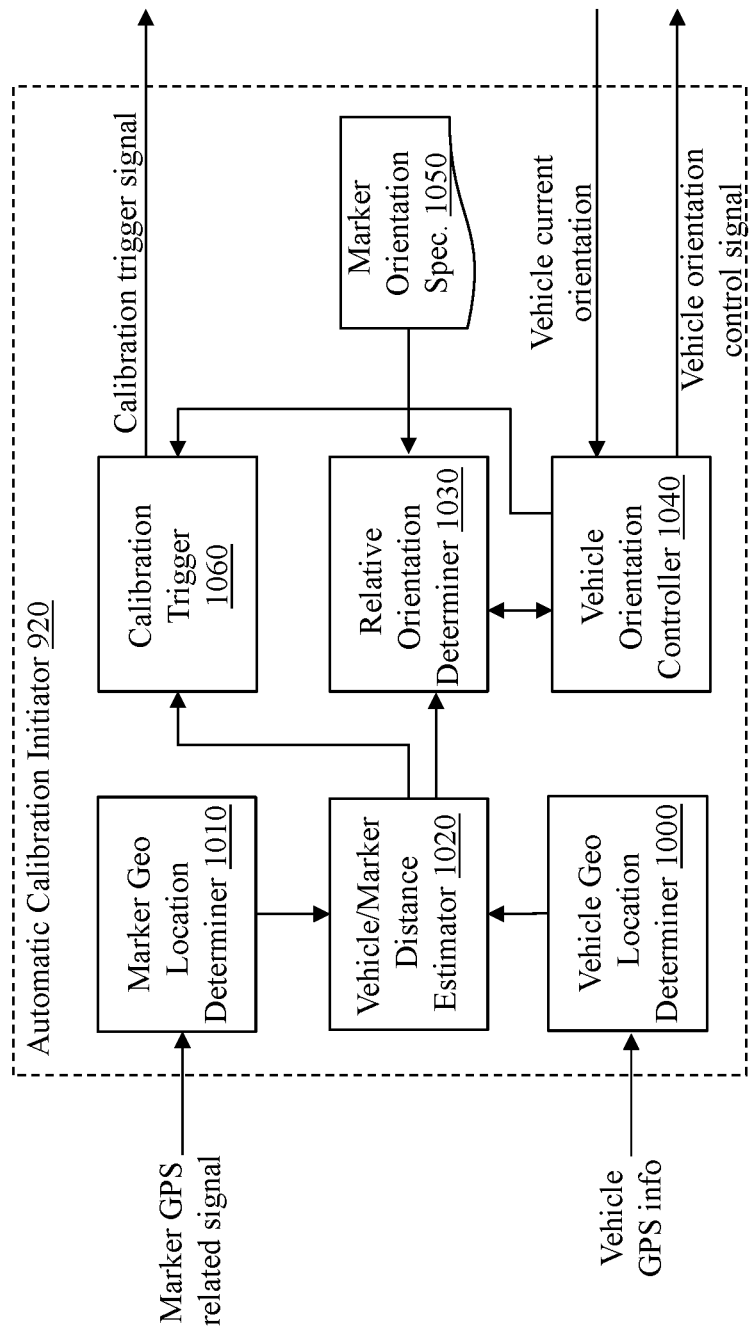
FIG. 10A depicts an exemplary high level system diagram of an automatic calibration initiator, in accordance with an embodiment of the present teaching.
Figure 10B:
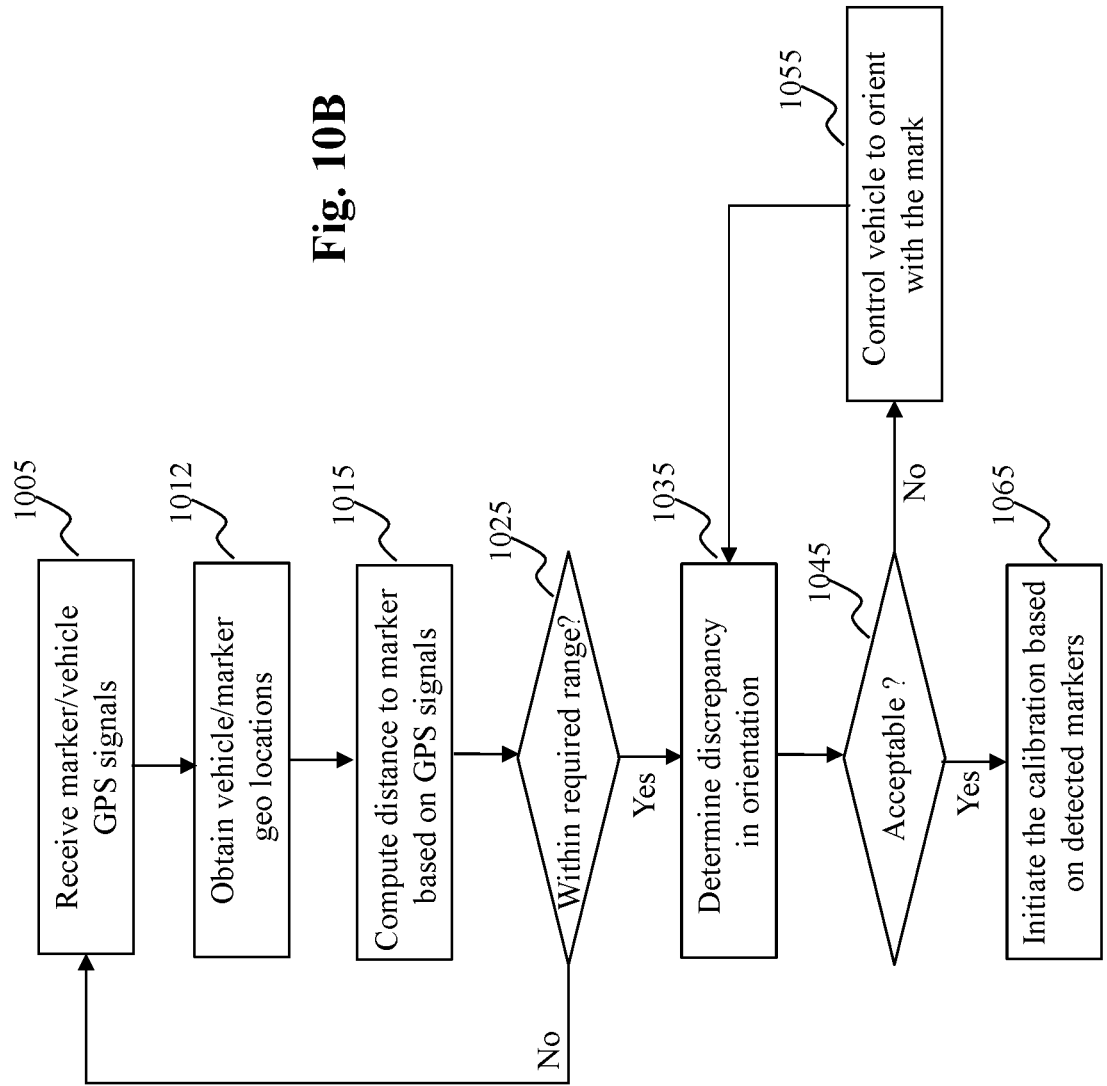
FIG. 10B is a flowchart of an exemplary process of an automatic calibration initiator, in accordance with an embodiment of the present teaching.

FIG. 10A depicts an exemplary high level system diagram of the automatic calibration initiator 920, in accordance with an embodiment of the present teaching. In this illustrated embodiment, the automatic calibration initiator 920 includes a vehicle geo location determiner 1000, a marker geo location determiner 1010, a vehicle/marker distance estimator 1020, a relative orientation determiner 1030, a vehicle orientation controller 1040, and a calibration trigger 1060. FIG. 10B is a flowchart of an exemplary process of the automatic calibration initiator 920, in accordance with an embodiment of the present teaching. In operation, the vehicle geo location determiner 1000 and the marker geo location determiner 1010 receive, at 1005, respectively, vehicle GPS information from satellite(s) and marker GPS related signal(s) from integrated fiducial marker(s). Based on such received information, the vehicle geo location determiner 1000 and the marker go location determiner 1010 determine, at 1012, the geo location of the vehicle and the geo location of the marker(s), respectively. Based on the marker GPS signal received, the marker geo location determiner 1010 determines the geo location of the marker(s). Using the determined vehicle and marker geo locations, the vehicle/marker distance estimator 1020 computes, at 1015, the distance between the vehicle and the marker(s).

With respect to some criteria, e.g., the distance being smaller than a threshold, so long as the distance does not meet the criteria, determined at 1025, the vehicle geo location determiner 1000 and the marker geo location determiner 1010 continue to receive GPS information from their respective sources. When the estimated distance meets the criteria, the vehicle/marker distance estimator 1020 activates the relative orientation determiner 1030 that determines, at 1035, a discrepancy in orientation between the vehicle and the detected fiducial marker(s). As illustrated herein, to enable a sensor to use an integrated fiducial marker for calibration, being in a close proximity to the markers may not be adequate and the markers need also to be in the field of view of the sensor. The discrepancy in orientation determined by the relative orientation determiner 1030 may be used to determine, e.g., a desired orientation that the vehicle needs to be in in order to calibrate a specific sensor. Such a desired orientation may be determined based on, e.g., information stored in the marker orientation 1050 which specifies the orientation that a vehicle needs to be positioned in order to utilize the markers to perform calibration.

The information of such determined desired orientation may be sent to the vehicle orientation controller 1040, which receives information from the vehicle indicating the current orientation of the vehicle and determines, at 1045, whether the current vehicle pose satisfies the desired orientation. If the current vehicle orientation is acceptable with respect to the desired orientation, the vehicle orientation controller 1040 activates the calibration trigger 1060 that initiates, at 1065, the multi-sensor calibrator 940 by sending a calibration trigger signal. When the current vehicle orientation does not satisfy the desired orientation, the vehicle orientation controller 1040 generates vehicle orientation control signal and sends to the vehicle to control, at 1055, the vehicle to move around to be in the desired orientation. The vehicle control process continues with steps 1035, 1045, and 1055 until the vehicle orientation reaches an acceptable range of the desired orientation.

Figure 11A:
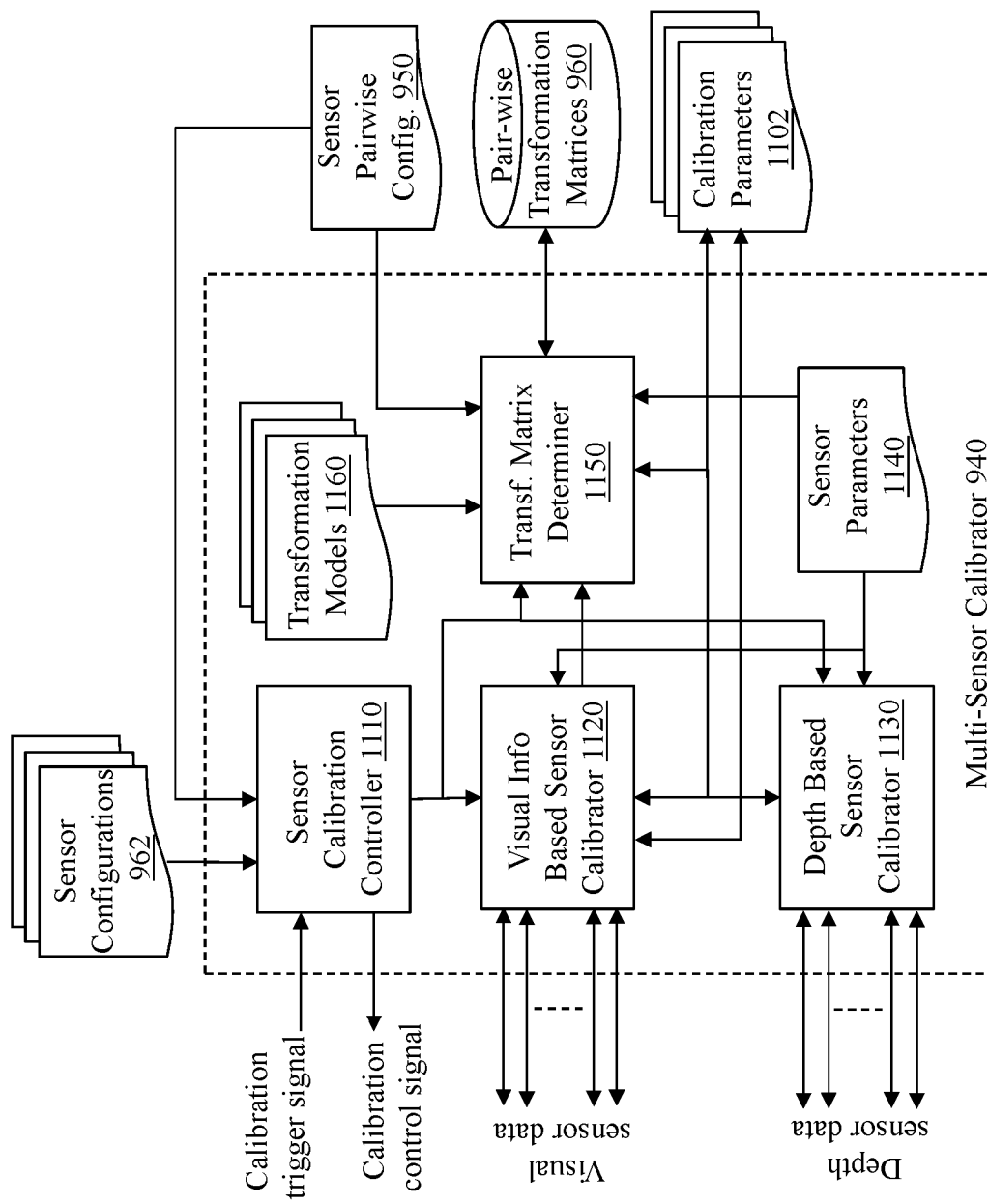
FIG. 11A depicts an exemplary high level system diagram of a multi-sensor calibrator, in accordance with an embodiment of the present teaching.
Figure 11B:
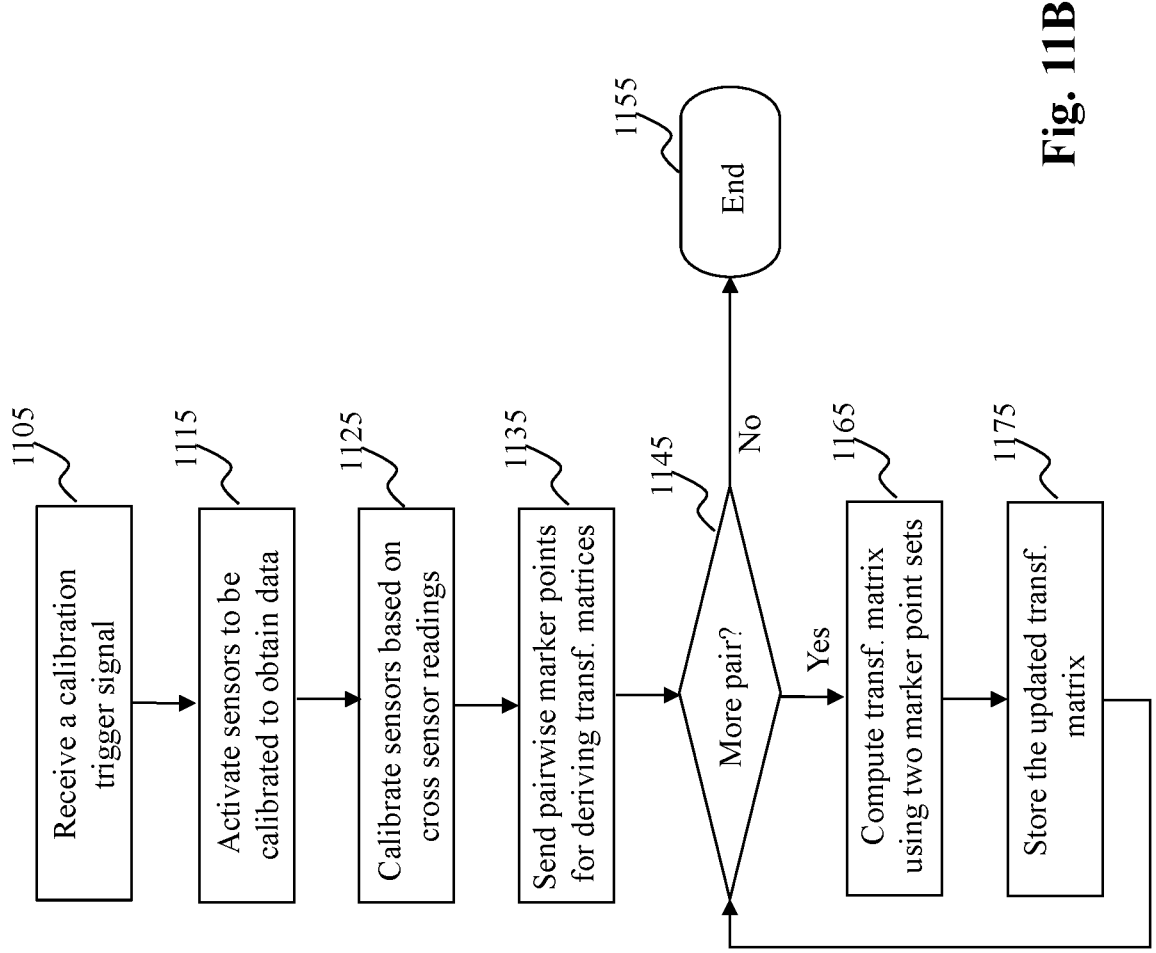
FIG. 11B is a flowchart of an exemplary process of a multi-sensor calibrator, in accordance with an embodiment of the present teaching.

FIG. 11A depicts an exemplary high level system diagram of the multi-sensor calibrator 940, in accordance with an embodiment of the present teaching. In this illustrated embodiment, the multi-sensor calibrator 940 comprises a sensor calibration controller 1110, a visual information based sensor calibrator 1120, a depth based sensor calibrator 1130, and a transformation matrix determiner 1150. FIG. 11B is a flowchart of an exemplary process of the multi-sensor calibrator 940, in accordance with an embodiment of the present teaching. In operation, when the sensor calibration controller 1110 receives, at 1105, a calibration trigger signal, it controls certain sensors to start to carry out the calibration. As discussed herein, the received calibration trigger signal may be generated either manually based on a manual command from a user (either a driver of the vehicle or a personnel for calibrating the sensors) or automatically based on the detected relative spatial relationship between the vehicle and a set of integrated fiducial markers. The required relative spatial relationship may be defined based on distance and orientation consistency. In some embodiments, the trigger signal may also include indication of which sensors are to be calibrated upon receiving the trigger signal. For example, a manual command may specify such information. In an automatic mode, the automatic calibration initiator 920 may also specify such information based on, e.g., the sensed distance and pose of the markers relative to which sensors deployed on the vehicle.

To control the calibration of certain sensors, the sensor calibration controller 1110 may initiate the operation of such calibrators by appropriately activating, at 1115, relevant calibration modules based on the nature of the sensors to be calibrated. As commonly known, some sensors operate based on visual information. Some sensors operate based on depth or distance information. Different types of sensors may be calibrated differently. In this illustrated embodiment, exemplary calibrators for visual information based sensor and depth based sensors are provided and they are merely for illustration purposes and do not serve as limitation on what types of calibrator may be included in the multi-sensor calibrator 940.

Once activated, a calibrator then proceed to calibrate sensors in appropriate modalities based on the activation signals from the sensor calibration controller 1110. If a sensor to be calibrated is one that operates based on visual information, the sensor calibration controller 1110 invokes the visual information based sensor calibrator 1120 to calibrate the sensor. If a sensor to be calibrated is one that operates on depth or distance type of information, the sensor calibration controller 1110 invokes the depth based sensor calibrator 1130 to calibrate the sensor. Upon being activated, the activated calibrator (either 1120 or 1130) then proceeds to calibrate, at 1125, one or more sensors by activating the sensors to collect sensor information and then calibrating the sensors based on the received sensor information. The calibration parameters obtained by the calibrators (1120 or 1130) may then be saved in a storage 1102 or used to update the previously stored calibration parameters. 3D points estimated by each of the sensors being calibrated may also be sent, at 1135, from respective sensors to the transformation matrix determiner 1150 for deriving corresponding transformation matrices.

Once individual sensors are calibrated, pairwise transformation matrices between different pairs of sensors may be computed based on 3D points estimated by different sensors in their respective coordinate systems, as discussed herein. To determine pairs of sensors for which a transformation matrix is to be computed, the transformation matrix determiner 1150 accesses, e.g., configuration information stored in the sensor pairwise information storage 950. For each pair of sensors for which a transformation matrix is needed, identified at 1145, two sets of 3D points corresponding to the detected marker points received from respective calibrator(s) are used to determine, at 1165, the transformation matrix in accordance with the computation described herein. Such computed transformation matrix is then stored, at 1175, in the storage 960 for pairwise transformation matrices. The transformation matrix determiner 1150 continues to compute different transformation matrices for all pairs of sensors as specified by the sensor pairwise configuration (from 950) until such matrices for all required pairs are completed, as determined at 1145.

As discussed herein, with the disclosed approach, not only multiple sensors can be simultaneously calibrated, because such different sensors use the same reference object (the integrated fiducial marker), the 3D point sets identified by different sensors in their respective coordinate systems can be used as well to compute the transformation matrices between different pairs of sensors. This remedies the deficiencies of the state of the art in calibrating sensors and computing transformation matrices between different sensors.

Figure 12:
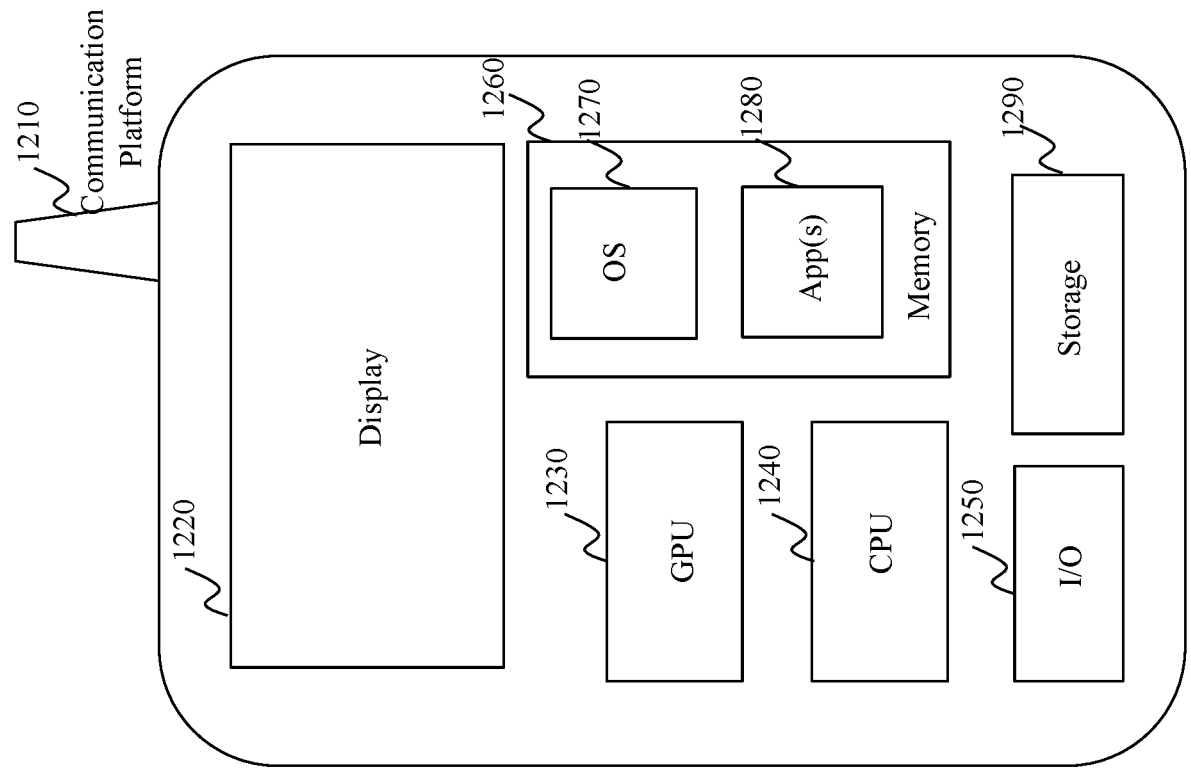
FIG. 12 is an illustrative diagram of an exemplary mobile device architecture that may be used to realize a specialized system implementing the present teaching in accordance with various embodiments.

FIG. 12 is an illustrative diagram of an exemplary mobile device architecture that may be used to realize a specialized system implementing the methods of protecting sensors and sensor assembly as disclosed in the present teaching in accordance with various embodiments. In this example, a device on which the present teaching is implemented corresponds to a mobile device 1200, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1200 may include one or more central processing units ("CPUs") 1240, one or more graphic processing units ("GPUs") 1230, a display 1220, a memory 1260, a communication platform 1210, such as a wireless communication module, storage 1290, and one or more input/output (I/O) devices 1240. Any other suitable component, including but not limited to a system bus or a controller (not shown), may also be included in the mobile device 1200. As shown in FIG. 12 a mobile operating system 1270 (e.g., iOS, Android, Windows Phone, etc.), and one or more applications 1280 may be loaded into memory 1260 from storage 1290 in order to be executed by the CPU 1240. The applications 1280 may include suitable mobile apps for managing the tasks related to the present teaching on mobile device 1200. User interactions may be achieved via the I/O devices 1240.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 13:
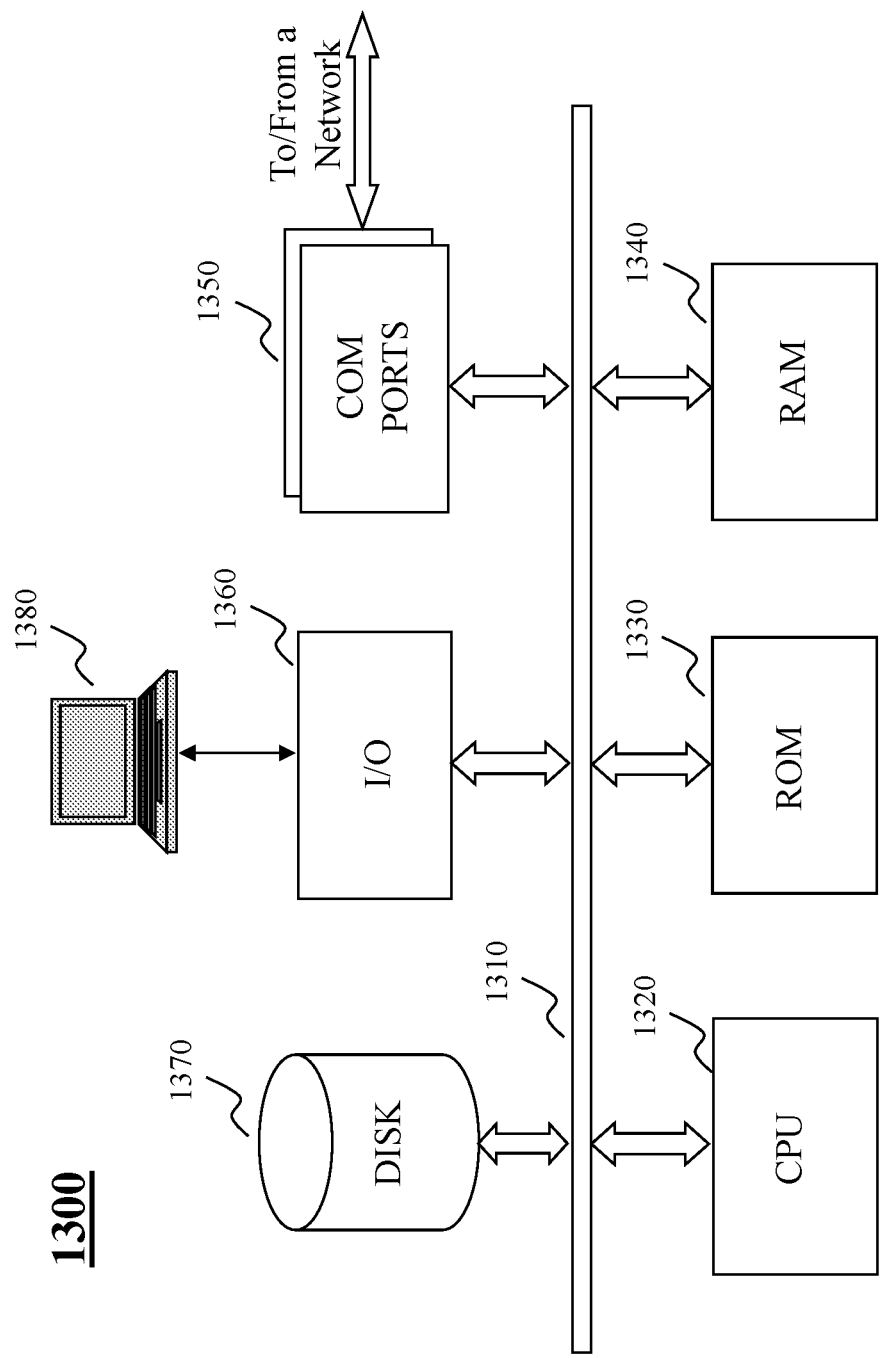
FIG. 13 is an illustrative diagram of an exemplary computing device architecture that may be used to realize a specialized system implementing the present teaching in accordance with various embodiments.

FIG. 13 is an illustrative diagram of an exemplary computing device architecture that may be used to realize a specialized system implementing various functionalities related to the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1300 may be used to implement any component of conversation or dialogue management system, as described herein. For example, various functions associated with the present teaching may be implemented on a computer such as computer 1300, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1300, for example, includes COM ports 1350 connected to and from a network connected thereto to facilitate data communications. Computer 1300 also includes a central processing unit (CPU) 1320, in the form of one or more processors, for executing program instructions. The exemplary computer platform includes an internal communication bus 1310, program storage and data storage of different forms (e.g., disk 1370, read only memory (ROM) 1330, or random access memory (RAM) 1340), for various data files to be processed and/or communicated by computer 1300, as well as possibly program instructions to be executed by CPU 1320. Computer 1300 also includes an I/O component 1360, supporting input/output flows between the computer and other components therein such as user interface elements 1380. Computer 1300 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus comprising:
    a processor; and
    a memory operably coupled to the processor, the memory storing instructions that when executed by the processor cause the apparatus to perform operations comprising:
    estimating a distance between a first geo-position associated with a vehicle and a second geo-position associated with a fiducial marker having a marker GPS receiver;
    determining an orientation of the fiducial marker based on a GPS related signal;
    sending a signal to change an orientation of the vehicle such that orientation of the vehicle relative to orientation of the fiducial marker is less than an orientation discrepancy threshold; and
    initiating calibration of one or more sensors disposed with the vehicle using the fiducial marker when the distance is less than a distance threshold.

2. The apparatus of claim 1, wherein the operations further comprise:
    determining whether the orientation of the vehicle relative to the orientation of the fiducial marker is less than the orientation discrepancy threshold.

3. The apparatus of claim 1, wherein the operations further comprise:
    determining whether the distance is less than the distance threshold.

4. The apparatus of claim 1, wherein the fiducial marker is from a plurality of fiducial markers in a three-dimensional (3D) configuration configured to enable the calibration of the one or more sensors simultaneously.

5. The apparatus of claim 1, wherein:
    the one or more sensors include a first sensor of a first type and a second sensor of a second type different from the first type;
    the calibration includes calibrating the first sensor and the second sensor simultaneously.

6. The apparatus of claim 1, wherein
    the initiating the calibration of the one or more sensors comprises:
    sending a signal to the one or more sensors to activate the one or more sensors to capture data associated with the fiducial marker; and generating calibration parameters of the one or more sensors based on the data associated with the fiducial marker.

7. The apparatus of claim 1, further comprising a GPS receiver and the one or more sensors.

8. A non-transitory, computer-readable storage medium including instructions that, when executed by at least one processor of a computing system, cause the computing system to erform operations comprising:
estimating a distance between a first geo-position associated with a vehicle and a second geo-position associated with a fiducial marker having a marker GPS receiver;
determining an orientation of the fiducial marker based on a GPS related signal;
sending a signal to change an orientation of the vehicle such that orientation of the vehicle relative to orientation of the fiducial marker is less than an orientation discrepancy threshold; and
initiating calibration of one or more sensors disposed with the vehicle using the fiducial marker when the distance is less than a distance threshold.

9. The non-transitory, computer-readable storage medium of claim 8, wherein the operations further comprise:
determining whether the orientation of the vehicle relative to the orientation of the fiducial marker is less than the orientation discrepancy threshold.

10. The non-transitory, computer-readable storage medium of claim 8, wherein the operations further comprise:
determining whether the distance is less than the distance threshold.

11. The non-transitory, computer-readable storage medium of claim 8, wherein the fiducial marker is from a plurality of fiducial markers in a three-dimensional (3D) configuration configured to enable simultaneous calibration of the one or more sensors.

12. The non-transitory, computer-readable storage medium of claim 8, wherein the initiating the calibration of the one or more sensors comprises:
sending a signal to the one or more sensors to activate the one or more sensors to capture data associated with the fiducial marker; and
generating calibration parameters of the one or more sensors based on the data associated with the fiducial marker.

13. The non-transitory, computer-readable storage medium of claim 8, wherein the fiducial marker having the marker GPS receiver is configured to broadcast a GPS related signal.

14. A computer-implemented method comprising:
estimating a distance between a first geo-position associated with a vehicle and a second geo-position associated with a fiducial marker having a marker GPS receiver;
determining an orientation of the fiducial marker based on a GPS related signal;
sending a signal to change an orientation of the vehicle such that the orientation of the vehicle relative to the orientation of the fiducial marker is less than an orientation discrepancy threshold; and
initiating calibration of one or more sensors disposed with the vehicle using the fiducial marker when the distance is less than a distance threshold.

15. The method of claim 14, further comprising:
determining whether the orientation of the vehicle relative to the orientation of the fiducial marker is less than the orientation discrepancy threshold.

16. The method of claim 14, further comprising:
determining whether the distance is less than the distance threshold.

17. The method of claim 14, wherein the fiducial marker is from a plurality of fiducial markers in a three-dimensional (3D) configuration configured to enable the simultaneous calibration of the one or more sensors.

18. The method of claim 14, further comprising:
sending a signal to the one or more sensors to activate the one or more sensors to capture data associated with the fiducial marker; and
generating calibration parameters of the one or more sensors based on the data associated with the fiducial marker.

19. The method of claim 14, wherein
the one or more sensors include a first sensor of a first type and a second sensor of a second type different from the first type;
the calibration includes calibrating the first sensor and the second sensor simultaneously.

20. The method of claim 14, further comprising:
deriving a transformation matrix for each pair of the one or more sensors.

* * * * *